US005600373A

United States Patent [19]
Chui et al.

[11] Patent Number: 5,600,373
[45] Date of Patent: Feb. 4, 1997

[54] METHOD AND APPARATUS FOR VIDEO IMAGE COMPRESSION AND DECOMPRESSION USING BOUNDARY-SPLINE-WAVELETS

[75] Inventors: Charles K. Chui; Pak-Kay Yuen, both of College Station, Tex.

[73] Assignee: Houston Advanced Research Center, The Woodlands, Tex.

[21] Appl. No.: 671,085

[22] Filed: Jun. 27, 1996

Related U.S. Application Data

[63] Continuation of Ser. No. 181,663, Jan. 14, 1994, abandoned.
[51] Int. Cl.$^6$ ........................................... H04N 7/18
[52] U.S. Cl. ................ 348/397; 348/398; 348/420; 348/421; 364/487; 364/481
[58] Field of Search .................... 348/397, 398, 348/405, 411, 420; 364/487, 481

[56] References Cited

U.S. PATENT DOCUMENTS

| | | | |
|---|---|---|---|
| 4,599,567 | 7/1986 | Goupillaud et al. | 324/77 |
| 4,941,193 | 7/1990 | Barnsley et al. | 382/56 |
| 4,974,187 | 11/1990 | Lawton | 364/728.01 |
| 5,007,016 | 4/1991 | Le Mehaute | 364/487 |
| 5,014,134 | 5/1991 | Lawton et al. | 358/261.3 |
| 5,065,447 | 11/1991 | Barnsley et al. | 382/56 |
| 5,068,911 | 11/1991 | Resnikoff et al. | 382/56 |
| 5,081,592 | 1/1992 | Jenq | 364/487 |
| 5,101,446 | 3/1992 | Resnikoff et al. | 382/56 |
| 5,148,498 | 9/1992 | Resnikoff et al. | 382/54 |
| 5,162,923 | 11/1992 | Yoshida et al. | 358/433 |
| 5,245,589 | 9/1993 | Abel et al. | 367/136 |
| 5,262,958 | 11/1993 | Chui et al. | 364/487 |
| 5,272,530 | 12/1993 | Cassereau | 358/136 |
| 5,276,629 | 1/1994 | Reynolds | 364/487 |
| 5,283,656 | 2/1994 | Sugahara | 358/261.1 |
| 5,315,670 | 5/1994 | Shapiro | 382/56 |
| 5,347,479 | 9/1994 | Miyazaki | 364/725 |

FOREIGN PATENT DOCUMENTS

| | | |
|---|---|---|
| 0611051A1 | 8/1994 | European Pat. Off. |
| 0622741A2 | 11/1994 | European Pat. Off. |

OTHER PUBLICATIONS

Chui, et al., "Wavelets on a Bounded Interval," *Numerical Methods of Approximation Theroy*, vol. 9, (Dec. 1992), pp. 53–75.

L. Andersonn, et al. "Wavelets On a Closed Subset of the Real Line" *Recent Advances in Wavelet Analysis*, (Academic Press, 1993) pp 1–61.

(List continued on next page.)

*Primary Examiner*—Tommy P. Chin
*Assistant Examiner*—Anand S. Rao
*Attorney, Agent, or Firm*—Anderson, Levine & Lintel

[57] ABSTRACT

A method and apparatus for performing video image compression and decompression are disclosed. The video image compression is performed using boundary-spline-wavelet decomposition, in which the wavelets applied to sample locations at the boundaries of image intervals are different from those applied to sample locations within the intervals. As a result, boundary effect artifacts that arise from the use of wavelets requiring support outside of the interval are avoided. The decomposition is performed first for horizontal rows of the image data, and then in a vertical direction upon the results of the first decomposition. Quantization serves to locally round off the higher frequency components of the decomposition, and the decomposition is repeated until the desired compression ratio is obtained. Lossless compression may then be applied to the decomposed image data, and the compressed image is transmitted or stored, depending upon the application. Decompression is effected by lossless decompression of the received data, followed by reconstruction of the image using boundary-spline-wavelets, repeated as necessary to fully reconstruct the image. The reconstructed image can then be displayed on a conventional video display. Compression and decompression of still images with even higher compression ratios may also be performed, while maintaining the high quality of the image.

39 Claims, 14 Drawing Sheets

OTHER PUBLICATIONS

Aase, et al., "Image Subband Coding Using Short-Kernel Cosine Modulated Filter Banks", *Signal Processing VI: Theories and Applications* (Elsevier, 1992), pp. 231–234.

Daubechies, "Two Recent Results on Wavelets: Wavelet Bases for the Interval, and Biorthogonal Wavelets Diagonalizing the Derivative Operator", *Recent Advances in Wavelet Analysis*, (Academic Press 1990) pp. 237–258.

Cohen, et al., "Multiresolution analysis, wavelets and fast algorithms on an interval", *C. R. Acad, Sci. Paris*, t. 316, Series 1, (Academie des Sciences 1993) pp. 417–421.

Barry Simon, "How Lossy Compression Shrinks Image Files", *PC Magazine,* (Jul., 1993) pp. 371, 372, 375, and 380.

Paul Wallich, "Wavelet Theory–An analysis technique that's creating ripples", *Scientific American,* (Jan., 1991) pp. 34–35.

Barry Simon, "Lossless Compression: How it Works", *PC Magazine,* (Jun. 29, 1993), pp. 305, 306, 311–313.

Barnsley, et al., *Fractal Image Compression,* (AK Peters, Ltd., 1993) pp. 173–198; 219–228.

Elizabeth Cocoran, "Not Just a Pretty Face—Compressing pictures with Fractals" *Scientific American,* (Mar. 1990), pp. 77–78.

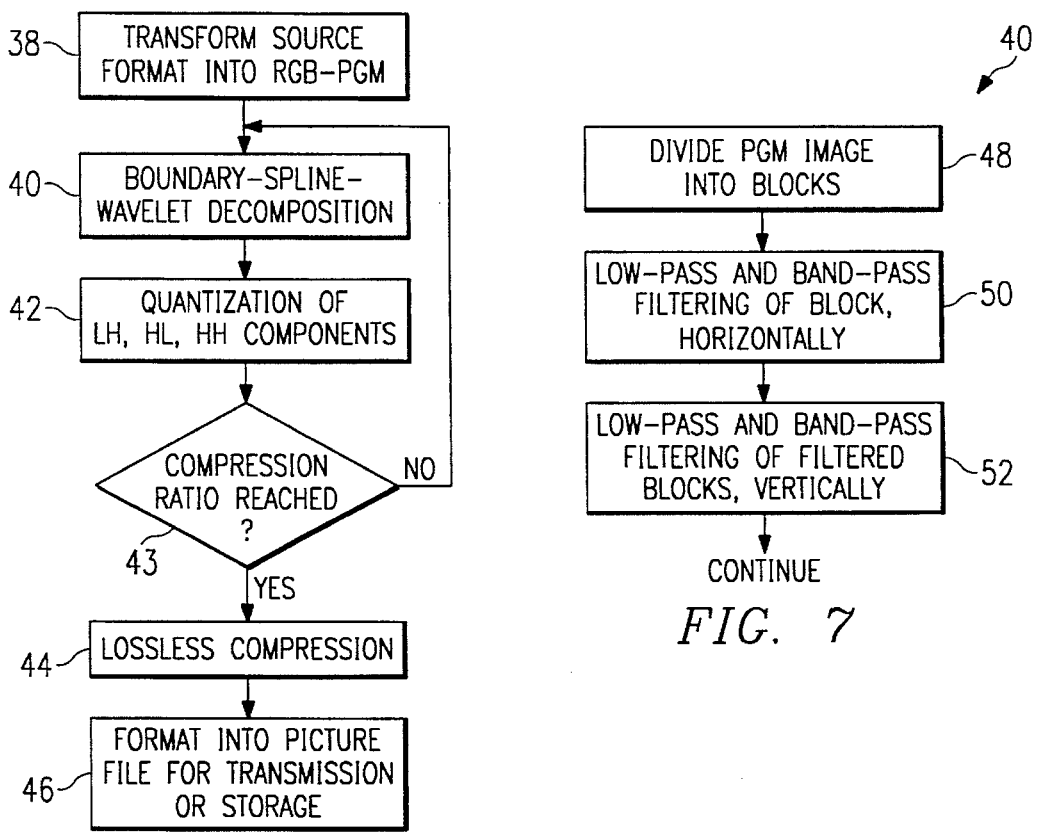
FIG. 6
FIG. 7
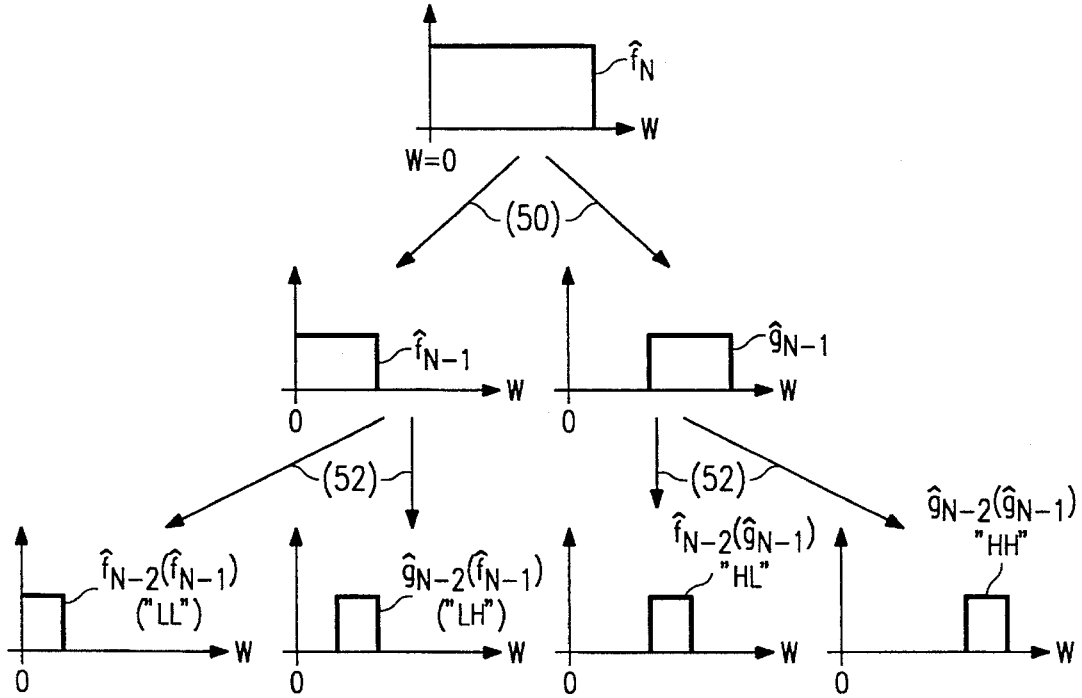
FIG. 8

$f_N(X,Y)$

FIG. 9a (rows of X's, labeled 51)

(50) ↓

$f_{N-1}(X,Y)$ / $g_{N-1}(X,Y)$

FIG. 9b (L's on left, H's on right, labeled 53)

(52) ↓

"LL" — A's (top-left) / "HL" — C's (top-right)

FIG. 9c

"LH" — B's (bottom-left) / "HH" — D's (bottom-right), labeled 55

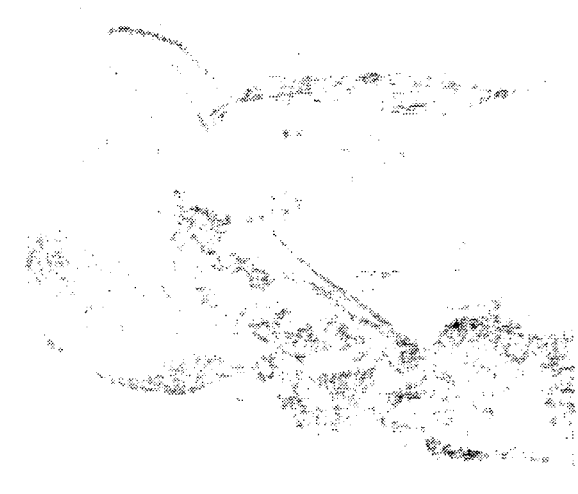
FIG. 13c  LH+HL+HH AFTER THRESHOLDING
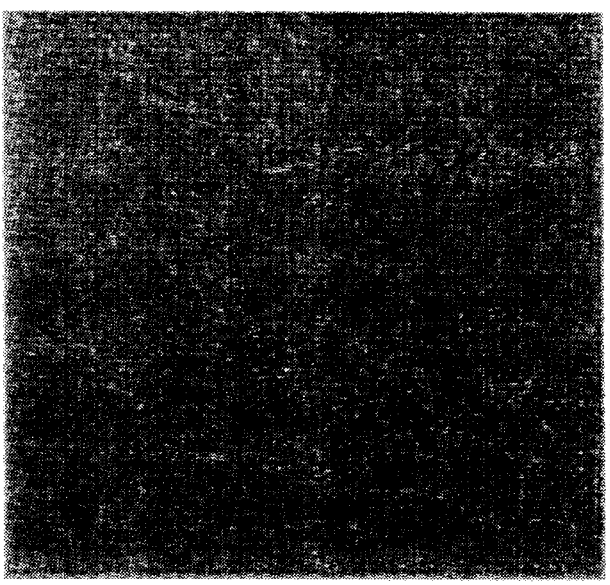
FIG. 13b  LH+HL+HH
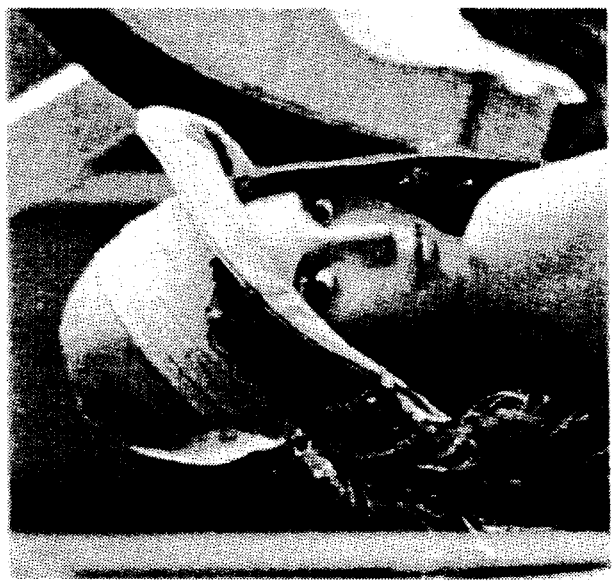
FIG. 13a  LL

METHOD AND APPARATUS FOR VIDEO IMAGE COMPRESSION AND DECOMPRESSION USING BOUNDARY-SPLINE-WAVELETS

This application is a continuation of application Ser. No. 08/181,663, filed Jan. 14, 1994, and entitled "Method and Apparatus for Video Image Compression and Decompression Using Boundary-Spline Wavelets", now abandoned.

This invention is in the field of video image storage and communication, and is more specifically directed to compression and decompression of video images, including motion video images and high-quality still video images.

BACKGROUND OF THE INVENTION

1. Conventional Video Compression

Modern electronic data processing systems are now often used not only for conventional numeric and text processing tasks, but also for processing data corresponding to visual images. As such, many modern computer and telecommunications systems have "multimedia" capabilities, where the data processed and communicated includes video images either generated by a computer or digitized from a conventional video camera.

The capacity required to communicate video images on a real-time basis is huge, however, when measured against modern capabilities. For example, a single video image (i.e., frame) displayed by a rectangular array of picture elements ("pixels") arranged in 640 rows by 800 columns, with the color of each pixel represented by twenty-four digital bits, would require over 1.52 million bytes (1500 kbytes) of digital memory to store all information in the frame. While this memory requirement for a single video frame is large, digital storage of a series of frames, such as a motion picture, will quickly consume the disk storage capacity of even high-end computers and workstations.

The large amount of digital data necessary to represent a video frame not only impacts computer storage requirements, but limits the rate at which conventional systems can communicate motion pictures. Considering that conventional high-speed digital communication channels have a bandwidth of on the order of from 40 to 80 MHz, it becomes quite apparent that conventional motion pictures of thirty frames per second, with 1500 kbytes of digital information per frame, cannot be fully transmitted in real-time over state of the art digital communications systems.

In response to these limitations on the ability of modern computer systems to store and communicate video information, various types of data compression techniques have been developed in recent years. Conventional data compression techniques are generally referred to as of either "lossless" or "lossy", depending upon whether data is discarded in the compression process.

A survey of conventional lossless data compression is provided in Simon, "Lossless Compression: How it Works", *PC Magazine* (Jun. 29, 1993), pp. 305–13. Examples of conventional lossless data compression techniques include Huffman encoding, Fano-Shannon encoding, and arithmetic encoding, as well as dynamic variations of the Huffman and Fano-Shannon probabilistic encoding techniques. In general, lossless compression techniques are primarily used to compress entered data such as data generated from data processing operations, rather than sampled data representative of analog video or audio signals, as decompression will reproduce all bits of the original compressed data stream.

Lossy data compression techniques, in contrast, provide additional data compression efficiency over lossless data compression, as some amount of data is discarded in these techniques. As a result, lossy data compression techniques are generally used on sampled data, as some amount of inaccuracy relative to the true input data is tolerable; lossy data compression is, of course, inappropriate for use on entered data streams such as those produced by a data processing operation. Accordingly, lossy data compression techniques are widely used in the field of compression of video and motion picture images to obtain a high degree of compression, as some inaccuracy may be tolerated. A survey of conventional lossy data compression techniques may be found at Simon, "How Lossy Data Compression Shrinks Image Files", *PC Magazine* (July 1993), pp. 371 et seq.

A popular conventional lossy data compression technique is referred to as the JPEG (Joint Photographic Experts Group) method. A description of this technique may be found in Barnsley and Hurd, *Fractal Image Compression* (AK Peters, Ltd., 1993), pp. 219–228. The JPEG compression method initially divides the image into blocks of pixels, and a Discrete Cosine Transform (DCT) is performed on each pixel block, producing a representation of the block as coefficients corresponding to frequencies and amplitudes, rather than corresponding directly to color information. These coefficients are then quantized, or rounded off, and a difference algorithm is performed over all quantized blocks in the image, in a selected scan order. This difference algorithm subtracts a DC term corresponding to the mean pixel value of a block, from the DC term of the preceding block. The difference coefficients are then scanned in a different order, such as a zig-zag order, and the non-zero coefficients (i.e., blocks in which a difference from the preceding block occurred) are coded to indicate the number of preceding zero coefficients (i.e., the number of pixel blocks in which no change occurred) and also the value of the non-zero difference. Lossless compression is then often applied to the coded result to further compress the data. Decompression is performed by reversing the compression process, producing the displayable image.

While the JPEG conventional video image compression technique is useful in obtaining high degrees of compression, it has been found that JPEG compression is incapable of being used in a real-time fashion for a motion picture. This is because the time generally required to perform the JPEG decompression of a motion picture frame exceeds the display time for the frame ($\frac{1}{30}$ second), and as a result the motion picture image cannot be decompressed for real-time display. Temporally accurate display of a motion picture compressed according to these techniques, thus requires the decompression and display to be done in two steps, with the decompressed motion picture stored on video tape or another medium from which the motion picture can be played with the proper time base.

Another conventional method of lossy video image compression referred to as Recursive Vector Quantization (RVQ) quantizes the pixel blocks directly, without a DCT or other transform, according to a set of selected reference tiles. See Simon, July 1993, *op. cit*. The reference tiles are selected according to an iterative technique, based upon the accuracy of the results relative to the original image. As noted in the Simon article, compression according to the RVQ method is computationally intense and complex, but decompression can be done quite rapidly.

Another type of conventional lossy video image compression techniques is referred to as fractal compression. As is well known in the art, a fractal is a mathematical image object that is self-similar, in that the image can be represented in terms of other pieces of the image. In fractal image compression, the input image is similarly divided into pixel groups, or tiles. Each tile is then approximated by a transformation (contractive, rotational, or both) of one or more other reference regions of the image. The compressed image thus consists of a full representation of the reference region, plus the transformation operators for each of the tiles. Each tile of the image is decompressed by performing a transformation of the reference region using the stored transformation operator for that tile. Detailed descriptions of conventional fractal image compression techniques and systems for performing the same may be found in Barnsley & Hurd, *Fractal Image Compression* (AK Peters, Ltd., 1993), in U.S. Pat. No. 4,941,193, and in U.S. Pat. No. 5,065,447.

2. Frequency and Time Windowing Functions

By way of further background, the field of wavelet analysis has recently become popular in the analysis of the time and frequency response and behavior of signals. The following section of this application is intended to provide a theoretical background for wavelet analysis techniques in order to both convey the state of the art in wavelet analysis, and also to provide the necessary background for the person of ordinary skill in the art to fully appreciate the present invention.

In the general sense, wavelet analysis is concerned with performing time-frequency localization of the signal to be analyzed (i.e., the "input signal"). Time-frequency localization refers to the analysis of a portion of the frequency spectrum of the input signal over a selected time window. As will become apparent from the description in this specification, time-frequency localization of an input signal enables data processing techniques to be applied to the signals for a wide range of purposes.

a. Conventional Analog Filtering

In the time domain, frequency-windowing is done by convolving a time-domain window filter function with the input signal; in the frequency domain, the frequency-windowing is done by multiplying the spectrum of the input signal with the frequency-domain transfer function of the filter function. Typical filter functions include low-pass filters (e.g., the Shannon sampling function) and band-pass filters. Through use of such filters, a bandwidth limited signal $f_\Omega(t)$ (i.e., zero amplitude for all frequencies above a limit $\Omega$) may be decomposed into the sum of a low-frequency component with a series of non-zero frequency bands. An expression for such a decomposition is as follows:

$$f_\Omega(t) = f_{\Omega,\omega_0}(t) + g_{\Omega,1}(t) + \ldots + g_{\Omega,N}(t) \quad [1]$$

where $f_{\Omega,\omega_0}$ is the low-pass filtered ($\omega < \omega_0$) component of the input signal $f_\Omega(t)$, where $g_{\omega,i}(t)$ is the band-pass filtered signal for the ith frequency band, and where $\omega_N = \Omega$. An ideal low-pass filtered component $f_{\Omega,\omega_0}$ corresponds to the time-domain convolution of the well-known Shannon sampling function with the input signal. Ideal band-pass filtering may be performed by time-domain convolution of a filter function of the type:

$$\frac{\sin\omega_n t - \sin\omega_{n-1} t}{\pi t} \quad [2]$$

with the time-domain input signal, $\omega_n$ and $\omega_{n-1}$ being the upper and lower limits of the frequency band.

Each of the low-pass and band-pass filter functions provide ideal frequency localization of the input signal $f_\Omega(t)$, such that each expression $f_{\Omega,\omega_0}$ and $g_{\Omega,i}(t)$ provide precise information regarding the frequency spectrum of input signal $f_\Omega(t)$ within its respective frequency band. However, the time localization provided by this decomposition is quite poor, as these filters do not provide very precise information about when (in the time domain) a signal behaves differently within certain frequency ranges. As many important real-world signals include brief periods of time of rapid transient change, analysis of signals decomposed in this manner will not be able to account for the time at which such transient behavior occurs. For signal analysis where time localization is important, conventional Fourier analysis techniques therefore falls short of the need.

b. Time and Frequency Windowing

Certain conventional signal analysis techniques have addressed this problem by time-windowing the input signal, thus allowing time-localization as well as frequency localization. According to these techniques, a window function $h(t)$ is applied to the input signal $f(t)$ to window the input signal near a specified point in time $t=b$. This windowing may be considered by the integral transform:

$$\int_{-\infty}^{\infty} f(t)\overline{h(t-b)}dt \quad [3]$$

where the bar over the function $h(t-b)$ denotes complex conjugation. For a real-valued even windowing function $h(t)$, this windowing process corresponds to convolution, allowing treatment of the windowing function $h(t)$ as a filter. For example, if $h(t)$ is the Shannon sampling function, the windowing process of the above equation will apply a low-pass filter to the input signal. However, it has been observed that the slow decay of the Shannon sampling function over time results in a very imprecise time-domain windowing operation.

Those windowing functions $h(t)$, for which the square of the magnitude have finite first and second moments and finite energy, (i.e., that decay sufficiently rapidly at infinity) will produce a time-window having a "center" $t^*$ and a "radius" $\Delta_h$. The center $t^*$ may be calculated as a mean value, while the radius may be calculated as the standard deviation of the windowing function around the mean $t^*$. For a windowing function of radius $\Delta_h$, the width of the time-window will be $2\Delta_h$, commonly referred to as the RMS duration of the windowing function $h(t)$. In the frequency domain, if the square of the magnitude of the Fourier transform $\hat{h}(\omega)$ of the windowing function $h(t)$ has finite first and second moments, the frequency domain windowing function $h(\omega)$ will have a center $\omega^*$ and a width $2\Delta_{\hat{h}}$, calculated in a manner similar to the mean and standard deviation (doubled) of the frequency domain function $\hat{h}(\omega)$; the width $2\Delta_{\hat{h}}$ is usually called the RMS bandwidth of the windowing function $h(t)$. If the RMS duration $\Delta_h$ is finite, then the time-domain windowing function $h(t)$ is a time-window; similarly, if the RMS bandwidth $2\Delta_{\hat{h}}$ is finite, the frequency-domain windowing function $\hat{h}(\omega)$ is a frequency window.

Referring back to the ideal low-pass and band-pass filter time-domain functions noted above, it will be readily apparent that their first moment is infinite, meaning that neither of these ideal filter functions can serve as time windows if used as windowing functions $h(t)$. However, the frequency domain representations of the ideal low-pass and band-pass filter functions have finite RMS bandwidth $2\Delta_{\hat{h}}$, so that these filters provide ideal frequency-localization as is evident from their ideal nature.

As discussed above, accurate analysis of real-world signals containing transient behavior requires both time-localization and frequency-localization. The Uncertainty Principle has identified those windowing functions h that provide both time windowing and frequency windowing as those functions that satisfy the following inequality:

$$\Delta_h \Delta_{\hat{h}} \geq \frac{1}{2}$$

has also been previously found that the only types of windowing functions h(t) that achieve the lower bound of the Uncertainty Principle are those of the form:

$$h(t) = c e^{jat} e^{(t-b)^2/4\alpha} \qquad [6]$$

for some constants a, b, c and α with α>0 and c≠0.

Further indication of the presence of a time-frequency window by any windowing function h(t) may be obtained through the Parseval identity. The generalized windowing function h(t) noted above corresponds to:

$$\int_{-\infty}^{\infty} f(t)\overline{h(t-b)} dt = \frac{1}{2\pi} \int_{-\infty}^{\infty} \hat{f}(\omega) e^{jb\omega} \overline{\hat{h}(\omega)} d\omega \qquad [7]$$

With reference to the left side of equation [6], the time window is given by:

$$[b+t^* - \Delta_h, b+t^* + \Delta_h] \qquad [8]$$

such that the time window that is centered on t=t* is shifted by the parameter b; the time window also has a radius of $\Delta_h$ in the time dimension. Similarly, with reference to the right-hand side of equation [6], the frequency window is given by:

$$[\omega^* - \Delta_{\hat{h}}, \omega^* + \Delta_{\hat{h}}] \qquad [9]$$

and is thus centered at ω=ω* with width $2\Delta_{\hat{h}}$. FIG. 1a illustrates the location of time-frequency window 2 of equation [6] in a time-frequency coordinate system.

For causal real-valued window functions, where:

$$\hat{h}(-\omega) = \overline{\hat{h}(\omega)}$$

the function $|\hat{h}(\omega)|$ is an even function, so that the center ω* is located at ω=0 and the frequency window of equation [9] becomes $$[-\Delta_{\hat{h}}, \Delta_{\hat{h}}] \qquad [10]$$

However, while the time-frequency window of the filtering function h(t) may be moved along the time axis of FIG. 1a by changing the value of b, the window is fixed in frequency at the center frequency ω* or, in the case of real-valued even functions as noted above relative to equation [10], is fixed at a center frequency ω*=0, as shown in FIG. 1b. This fixation in frequency of the time-frequency window in limits the usefulness of the windowing process of equation [3].

c. The Short-Time Fourier Transform (STFT)

Rudimentary Fourier theory indicates that translation in the time-domain corresponds to a phase-shift in the frequency domain, and conversely that a phase-shift in the time-domain corresponds to a translation in the frequency domain. Accordingly, a phase shift in the windowing process of equation [3] should allow for sliding of the frequency window along the frequency-axis.

Considering a real-valued window function φ(t) which serves as a low-pass filter (i.e., $\hat{\phi}(\omega=0)=1$), and for which φ(t), $|t|^{1/2}\phi(t)$ and tφ(t) are in $L^2$, the short-time Fourier transform of φ(t) is defined by:

$$(G_\phi f)(b,\xi) := \int_{-\infty}^{\infty} f(t) e^{-j\xi t} \phi(t-b) dt \qquad [11]$$

for f ∈ $L^2$. The short-time Fourier transform (STFT) of equation [11] is also referred to in the literature as the Gabor transform. Applying the Parseval identity results in the following expression for the STFT, from which the center and radii of the time and frequency windows are apparent:

$$(G_\phi f)(b,\xi) = \frac{e^{-j\xi b}}{2\pi} \int_{-\infty}^{\infty} \hat{f}(\omega) e^{jb\omega} \overline{\hat{\phi}(\omega - \xi)} d\omega \qquad [12]$$

The short-time Fourier transform of equations [11] and [12] provide the improvement over the simple time-windowing process of equation [3] in that the frequency window function $\hat{\phi}(\omega)$ is able to slide along the frequency axis. The frequency window for a windowing function $\hat{\phi}(\omega)$ that otherwise (i.e., for ξ=0) has its center ω* at ω=0, is now localized to frequencies near ω=ξ:

$$[\xi - \Delta_{\hat{\phi}}, \xi + \Delta_{\hat{\phi}}] \qquad [13]$$

Similarly, where the center t* of the windowing function φ(t) is also otherwise (b=0) located at the origin, the time window is now localized near t=b as follows:

$$[b - \Delta_\phi, b + \Delta_\phi] \qquad [14]$$

The STFT thus allows for sliding of the time-frequency localization windows both in time and in frequency, merely by changing the values of the phase-shift factors b, ξ, respectively. FIG. 1c illustrates the position in time-frequency space of two time-frequency windows $5_0$, $5_1$, having phase-shift factors $(b_0, \xi_0)$, $(b_1, \xi_1)$, respectively. As a result, the STFT allows the lowpass window function to perform bandpass filtering by changing the value of ξ. However, as is evident in FIG. 1c, the widths of the windows are invariant with changes in time-shift factor b or frequency-shift factor ξ. Accordingly, while analysis is improved through use of the short-time Fourier transform, inaccuracies due to undersampling have been observed for those transient periods of time in which rapid changes (i.e., amplitudes over a wide range of frequencies) exist. Accordingly, not only is the ability to slide the localization windows in both time and frequency desired, but it is also desirable to allow for scaling of the window widths as a function of time or frequency.

3. Wavelet Analysis a. Theory

Wavelet analysis techniques address the need for time-frequency localization windows of flexible size, primarily by introducing a scale parameter that is mapped to the frequency variable. As a result, the scale parameter will change the widths of the windows as a function of frequency, thus changing the aspect ratio of the windows with changes in frequency. Since the Uncertainty Principle requires the area of the windows to remain above a certain value, the time window width decreases and the frequency window width increases proportionally as the center frequency ξ increases. The narrowing of the time window and widening of the frequency window for high frequency environments more precisely detects and analyzes these high frequency portions of input signals.

The basic wavelet transform is known as the integral wavelet transform, or IWT. The IWT includes a scale parameter a in its definition as follows:

$$\frac{1}{\sqrt{a}} \int_{-\infty}^{\infty} f(t) \overline{\psi\left(\frac{t-b}{a}\right)} dt \qquad [15]$$

As such, the window function $\psi$ narrows with changing values of the scale parameter a, such that the time width of $\psi$ decreases with decreasing a. The windowing function $\psi(t)$ used in the IWT of equation [15] is to be real-valued as before, but the IWT constraints also require $\psi(t)$ to be a bandpass filter rather than a low pass filter, such that its Fourier transform $\hat{\psi}(\Omega=0)=0$, stopping at least zero frequency components of the signal. Since the windowing function $\psi(t)$ is real-valued, its Fourier transform $\hat{\psi}(\omega)$ satisfies:

$$\hat{\psi}(-\omega) = \overline{\hat{\psi}(\omega)} \qquad [16]$$

so that $|\hat{\psi}(\omega)|$ is an even function. Because only nonnegative frequencies are of interest, and since $\psi(t)$ is a band-pass filter, the Fourier transform $\hat{\psi}(\omega)$ need only be considered as a frequency window in the frequency domain $[0, \infty)$, with the centers and widths of the frequency window function $\hat{\psi}(\omega)$ being modified as a result. For a windowing function $\psi(t)$ in $L^2$, for which $|t|^{1/2}\psi(t)$ and $t\psi(t)$ are also in $L^2$ such that $\psi(t)$ is real-valued, and where $\hat{\psi}(\omega=0)=0$, the one-sided (i.e., nonnegative) frequency window center $\omega^*_+$ as a function on the domain $[0, \infty)$ is defined as:

$$\omega_+^* := \frac{\int_0^\infty \omega |\hat{\psi}(\omega)|^2 d\omega}{\int_0^\infty |\hat{\psi}(\omega)|^2 d\omega} \qquad [17]$$

and the one-sided radius of $\hat{\psi}(\omega)$ is defined as:

$$\Delta_{\hat{\psi}}^+ := \sqrt{\frac{\int_0^\infty (\omega - \omega_+^*)^2 |\hat{\psi}(\omega)|^2 d\omega}{\int_0^\infty |\hat{\psi}(\omega)|^2 d\omega}} \qquad [18]$$

This allows the generation of an integral wavelet transform (IWT) using a normalization factor $a^{-1/2}$ based upon the scale parameter a, which scales the time-width of the window as a function of frequency. For a windowing function $\psi(t)$ that satisfies the conditions for equations [17] and [18] above, the IWT is defined as follows:

$$(W_\psi f)(b,a) := \frac{1}{\sqrt{a}} \int_{-\infty}^{\infty} f(t) \overline{\psi\left(\frac{t-b}{a}\right)} dt \qquad [19]$$

For the IWT of equation [19], the bandpass window-function $\psi(t)$ is commonly referred to as the analyzing wavelet.

As is known in the wavelet analysis field, and given the foregoing discussion, it is important that the integral wavelet transform $W_\psi$ allows for frequency localization where the width of the time window is mapped to the frequency domain, and in which the frequency window can slide along the frequency axis. For finite-energy real-valued input signals $f(t)$, and since $\psi(t)$ is real, the following relationship holds:

$$\hat{f}(-\omega)e^{jb\omega}\overline{\hat{\psi}(-a\omega)} = \overline{+e, cir f(\omega)e^{-jb\omega} + ee\hat{\psi}^*a\omega) + ee} \qquad [20]$$

Through the Parseval identity, one can then derive the IWT as follows:

$$(W_\psi f)(b,a) = \frac{\sqrt{a}}{\pi} Re \int_0^\infty \hat{f}(\omega) e^{-jb\omega} \eta\left(a\left(\omega - \frac{\omega_+^*}{a}\right)\right) d\omega \qquad [21]$$

for all $f \in L^2_R$, where $\omega_+^*$ is the one-sided center of $\hat{\psi}(\omega)$ on the domain $[0, \infty)$, and where $\eta$ is defined as follows:

$$\eta(\omega) := \hat{\psi}(\omega + \omega_+^*) \qquad [22]$$

As noted above, it is desirable to map the scale parameter a to the frequency at which the time-frequency window is to be localized. Accordingly, the scale parameter a is mapped to the shift frequency parameter $\xi$ as follows:

$$\xi := \frac{c}{a} \qquad [23]$$

for some $c>0$, where c is a calibration constant. Substituting for the scale parameter a defines the IWT as follows:

$$(W_\psi^* f)(b,\xi) := (W_\psi f)(b,a) = (W_\psi f)\left(b, \frac{c}{\xi}\right) \qquad [24]$$

It is convenient to set $c = \omega_+^*$, so that:

$$(W_\psi^* f)(b,\xi) = \frac{\sqrt{a}}{\pi} Re \int_0^\infty \hat{f}(\omega) e^{-jb\omega} \eta(a(\omega - \xi)) d\omega \qquad [25]$$

This produces a frequency window $\eta(a(\omega-\xi))$ that slides along the frequency axis with the value of $\xi$, having a range:

$$\left[\xi - \frac{1}{a} \Delta_{\hat{\psi}}^+, \xi + \frac{1}{a} \Delta_{\hat{\psi}}^+\right] \qquad [26]$$

The width of this window thus increases at higher frequencies $\xi$, as reflected in smaller values of the scale parameter a. In terms of the scale parameter a, the width of the frequency-window is as follows:

$$\left[\frac{1}{a}(\omega_+^* - \Delta_{\hat{\psi}}^+), \frac{1}{a}(\omega_+^* + \Delta_{\hat{\psi}}^+)\right] \qquad [27]$$

where the frequency shifting term $\xi = \omega_+^*/a$, such that the frequency-width of the frequency window increases with increasing frequency $\xi$ (decreasing values of a). Along the time-axis, the time window of the IWT of equation [19] is given by:

$$[b + at^* - a\Delta_\psi, b + at^* + a\Delta_\psi] \qquad [28]$$

As a result, the width of this time-window is $2a\Delta_\psi$, which decreases at higher frequencies $\xi$ (and lower values of a), and which increases at lower frequencies $\xi$. For the transform of equation [15], FIG. 1d illustrates three time-frequency windows $6_0, 6_1, 6_2$, with varying translation factor pairs $(b_0, \xi_0), (b_1, \xi_1), (b_2, \xi_2)$, respectively. As is evident in FIG. 1d, both the time-width and frequency-width of windows 6 vary with varying shift frequency $\xi$, such that the time-width decreases and the frequency-width increases with increasing $\xi$.

Accordingly, it should now be apparent to those in the art that wavelet analysis is capable of providing increased accuracy analysis of signals, particularly those including transient components, considering that, for higher frequency analysis, the width of the time window decreases and the width of the frequency window increases. This ensures adequate sampling of the input signal function, and also allows for determination of the exact time in the signal at which the transient event occurred.

As is known in the art of wavelet analysis, however, the definition of the proper wavelet function $\psi(t)$ is of great importance. Various specified analyzing functions have been used in wavelet analysis, with the selection of the function made according to computability, or according to attributes of the signal under analysis.

Prior Wavelets

Wavelet signal analysis has been applied to signals produced in seismic exploration for oil and gas, as described in U.S. Pat. No. 4,599,567. This reference describes a wavelet analysis technique using Morlet's wavelet as the analyzing wavelet. Morlet's wavelet is a sinusoid limited by a Gaussian probability envelope to a finite duration; the envelope may or may not be skewed toward either the leading or lagging edge of the time-domain envelope of the wavelet, as desired for the type of signal under analysis. This reference also discloses circuitry for performing the wavelet analysis of an incoming signal using such analyzing wavelet.

Another finite duration analyzing wavelet was proposed by Yves Meyer. This analyzing wavelet is substantially a finite duration uniform magnitude level over the wavelet window, analogous to the Shannon sampling function.

Other wavelets have been proposed which are not expressible by a mathematical formula, but instead are utilized as numeric wavelets. These wavelets include the Battle-Lemanne wavelet, which is a spline function of infinite duration, and the Daubechies wavelet, which is a fractal wavelet of finite duration. The lack of explicit formulae for these wavelets limit their applicability for rapid and accurate computer implementation of the wavelet analysis technique in computer hardware.

Another previously published wavelet is the Chui-Wang wavelet, which is a wavelet of finite duration but which may be expressed in an explicit formula.

The support for each of the prior wavelets noted above is over an unbounded interval. However, since real-world problems require the application of the wavelets to bounded intervals, wavelet analysis of input signals using these prior wavelets result in errors of the type commonly referred to as "boundary effects".

FIG. 2 graphically illustrates the reason for boundary effects arising from such conventional wavelets. Conventional wavelet 7 illustrated in FIG. 2a is first-order spline-wavelet that is based on a function $\psi$ having moments with the following properties (for i=0, 1, . . . m−1, and some m≧1):

$$\int_{-\infty}^{\infty} t^i \psi \left( \frac{t-b}{a} \right) dt = 0 \qquad [29]$$

where a, b are scaling parameters as discussed above. The conventional wavelet 7 of FIG. 2a is not orthogonal over a bounded interval [c, d], however, meaning that:

$$\int_{c}^{d} t^i \psi \left( \frac{t-b}{a} \right) dt \ne 0 \qquad [30]$$

for all integers i>0.

FIG. 2 graphically illustrates the performance of the IWT using wavelet 7 having the above noted properties at a point in the time series which happens to be at or near the boundary of an interval [c, d]. Data points $f_2, f_3, f_4$ correspond to input signal samples within the interval, which are plotted against wavelet 7 in FIG. 2; in this example, for purposes of explanation, the input signal sample data closely matches the shape of wavelet 7 within the interval [c, d]. The position of wavelet 7 corresponds to the position, in performing the IWT, of the sample point of interest at the boundary value t=a. Since wavelet 7 at this position requires support outside of the interval [c, d] for which input signal data exists, the zero values that must be assumed for the data points $f_0, f_1$ outside of interval [c, d] necessarily fail to match wavelet 7. This will result in an non-zero result for the IWT, even where the input data signal within the interval [c, d] exactly matches wavelet 7. As is well known in the field of signal processing, this inaccuracy due to wavelet 7 requiring support outside of the bounded interval [c, d] is made manifest by boundary effects at the edges of the bounded interval, since the unbounded wavelet 7 fails to accurately represent the series of actual input signal sample data.

In the field of video image compression and analysis, boundary effects greatly affects the quality of the image displayed after compression and decompression. This is because the boundary effects will appear as false image data at the edges of pixel blocks corresponding to bounded intervals, and also at the edges of the image (even if no subdivision of the image is performed). The inaccuracies due to boundary effects also limit the ability to magnify an image when displayed, considering that the magnification will make the boundary effect errors to become even more visible.

c. The Boundary-Spline-Wavelet

By way of further background, a bounded interval wavelet is described in Chui and Quak, "Wavelets on a Bounded Interval", *Numerical Methods of Approximation Theory*, Volume 9 (Dec. 1992), pp. 53–75, incorporated herein by this reference. This wavelet, which has an explicit formula, is not only a function of the time variable t, but is also a function of the position of the sample within the interval [c, d], so as to account for boundary effects. In effect, sample locations near the boundaries of the interval will correspond to different wavelet shapes than will sample locations within the interval that are away from the boundaries. Boundary effects are eliminated as the boundary wavelets do not require support outside of the interval.

Referring now to FIGS. 3a through 3d, an exemplary set of four first-order wavelets 8 according to the Chui-Quak boundary-spline-wavelet approach are illustrated. FIG. 3a illustrates the shape of "boundary" wavelet $8_a$ for a sample location near the boundary t=a of the interval [a, b], while FIG. 3d illustrates the shape of boundary wavelet $8_b$ for a sample location near the boundary t=b of the interval [a, b]. FIGS. 3b and 3c each illustrate the shape of "inner" wavelets $8_i$ for sample locations within the interval [a, b] away from the boundaries. As is evident from FIGS. 3a through 3d, boundary wavelets $8a$, $8b$, have different shapes than inner wavelets $8_i$ (which have the same shape as one other). As is further evident from FIGS. 3a through 3d, neither inner wavelets $8_i$ nor boundary wavelets $8_a$, $8_b$ require support outside of the interval [a, b], or:

$$\int_{a}^{b} t^i \psi \left( \frac{t-b}{a} \right) dt = 0 \qquad [31]$$

for i=0, 1, . . . , m−1, and for some m≧0, for the entire set of wavelets 8 of FIGS. 3a through 3d. Accordingly, application of the set of boundary-spline-wavelets 8 to actual real-world data, for which the time interval is necessarily bounded, will not produce boundary effect artifacts.

Other boundary-wavelets are known, as described in Daubechies, "Two recent results on wavelets: Wavelet bases for the interval and biorthogonal wavelet diagonalizing the derivative operator", *Recent Advances in Wavelet Analysis*, Schumaker and Webb, ed. (Academic Press, 1993), pp.237–58. These wavelets are not spline functions, and do not have explicit formulae. As a result, it is believed that these wavelets are of limited effectiveness in video image compression and decompression.

4. Objects of the invention

It is therefore an object of the present invention to apply wavelet analysis tools to the task of video image compression for storage and transmission.

It is a further object of the present invention to provide an apparatus for performing video image compression according to a selected wavelet.

It is a further object of the present invention to provide an apparatus for receiving a compressed video image and to decompress the same for real-time playback of the stored or communicated video image information.

It is a further object of the present invention to provide such a method of compression and decompression such that the compressed image may be played locally at real-time.

It is a further object of the present invention to provide such a system and method which allows for high accuracy magnification of the decompressed image, with much reduced incidence of edge effects.

It is a further object of the present invention to provide such a system and method which provides a high degree of compression.

It is a further object of the present invention to provide such a system and method which can utilize dynamic compression on a frame-by-frame basis, such that high frequency frames may be compressed to different ratios than low frequency frames.

It is a further object of the present invention to provide such a system and method which facilitates interactive display of a motion image, including insertion, editing and repetitive display.

It is a further object of the present invention to provide such a system and method which provides the ability for slow display systems to skip certain frames so that a motion picture can be displayed on a real-time basis by such slower systems, although with fewer frames per second.

It is a further object of the present invention to provide such a method and system which allows for division of an image into several portions for purposes of compression and communication or storage, with subsequent display of the full image after decompression.

It is a further object of the present invention to provide such a method and system which allows for higher lossy compression ratios by further quantization, as useful in compressing and decompressing high-quality 24-bit still images.

Other objects and advantages will be apparent to those of ordinary skill in the art having reference to the following specification, together with its drawings.

SUMMARY OF THE INVENTION

The present invention may be implemented into a method and apparatus for compressing and decompressing video images. The compression/decompression system receives video image data in a suitable format, such as eight-bit Portable Grey Level format, and includes circuitry for decomposing each component of the image into low and high frequency components by way of boundary-spline-wavelet decomposition. The system also includes circuitry for quantizing the high frequency portions of the decomposition. The decomposition may be repeated until the desired compression ratio is obtained. Lossless compression may then be performed on the compressed image, following which the compressed data may be stored for archival purposes, or may be transmitted to a receiving station.

According to the present invention, in decompression mode, the system performs lossless decompression of the stored or communicated image data, according to the compression scheme utilized. Reconstruction of the image is then performed by way of the boundary-spline-wavelet approach, in a reverse fashion relative to the image compression. The result of the decompression is then formatted as desired for display.

BRIEF DESCRIPTION OF THE DRAWINGS

FIG. 4b is an electrical diagram, in block form, of the image format converter in the system of FIG. 4a.

FIG. 6 is a flow diagram illustrating a method of compressing video image data according to the preferred embodiment of the invention.

FIG. 7 is a detailed flow diagram illustrating a method of performing the boundary-spline-wavelet decompression according to the preferred embodiment of the invention.

FIG. 8 is a series of frequency domain plots illustrating the decomposition of the video image according to the preferred embodiment of the invention.

FIGS. 9a through 9c are matrices illustrating the effect of decomposition of the video image according to the preferred embodiment of the invention.

FIGS. 13a through 13c illustrate the quantization of the decomposed video image of FIGS. 12a through 12e according to the preferred embodiment of the invention.

FIG. 15b is an electrical diagram, in block form, of a format converter useful in the decompressor of FIG. 15a.

DETAILED DESCRIPTION OF THE PREFERRED EMBODIMENT

1. Video Image Data Communication System

Figure 1A:
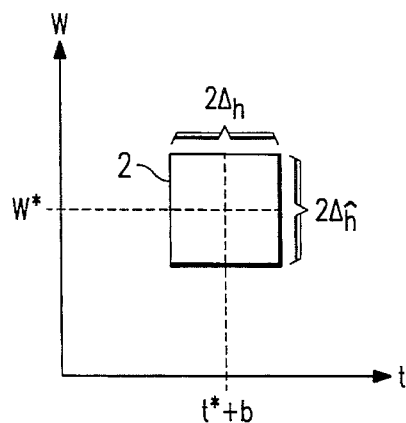
FIGS. 1a through 1d are time-frequency plots illustrating the concept of time-frequency windowing, as described in the background of the invention.
Figure 1B:
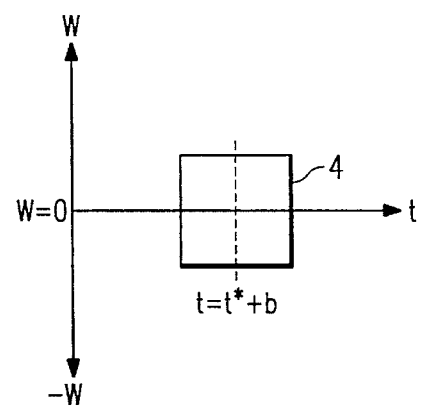
Figure 1C:
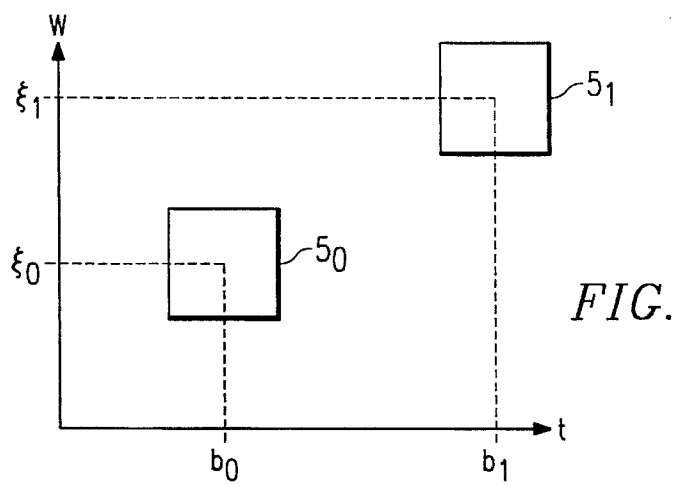
Figure 1D:
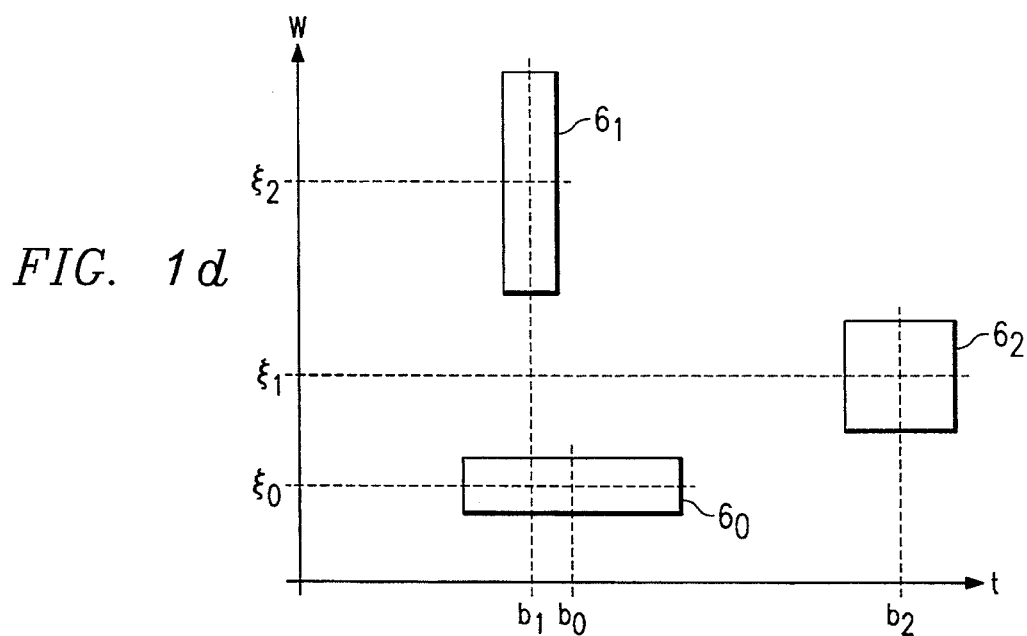
Figure 2:
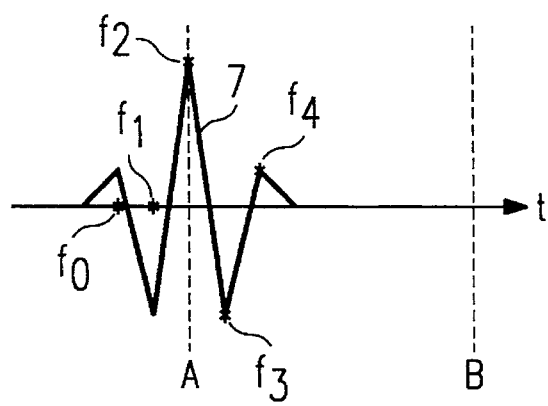
FIG. 2 is a graphical illustration of a wavelet with non-zero moments of any order relative to the interval [c, d], as applied to an input signal, and which is the source of boundary effects.
Figure 3A:
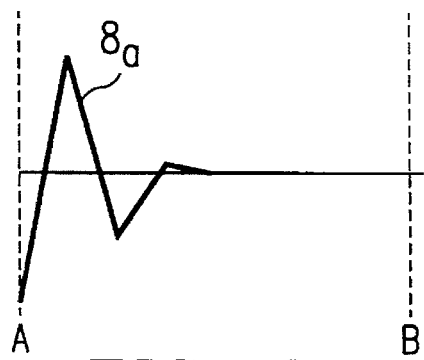
FIGS. 3a through 3d are graphical illustrations of an exemplary set of boundary-spline-wavelets as used in the preferred embodiment of the invention.
Figure 3B:
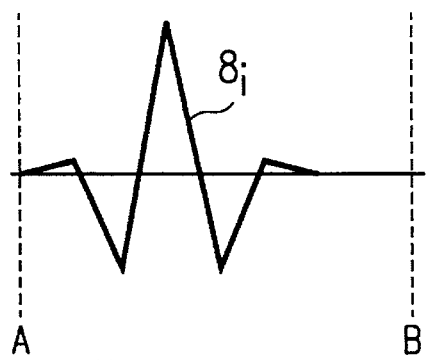
Figure 3C:
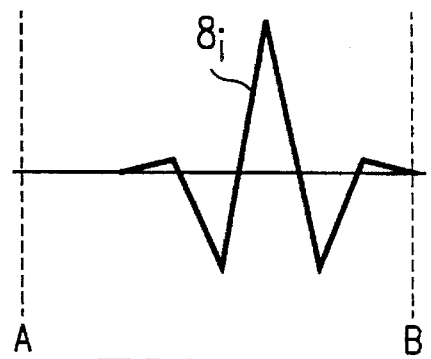
Figure 3D:
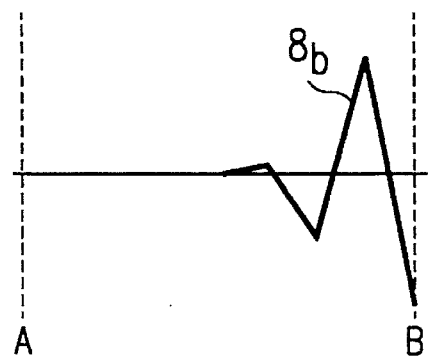
Figure 4A:
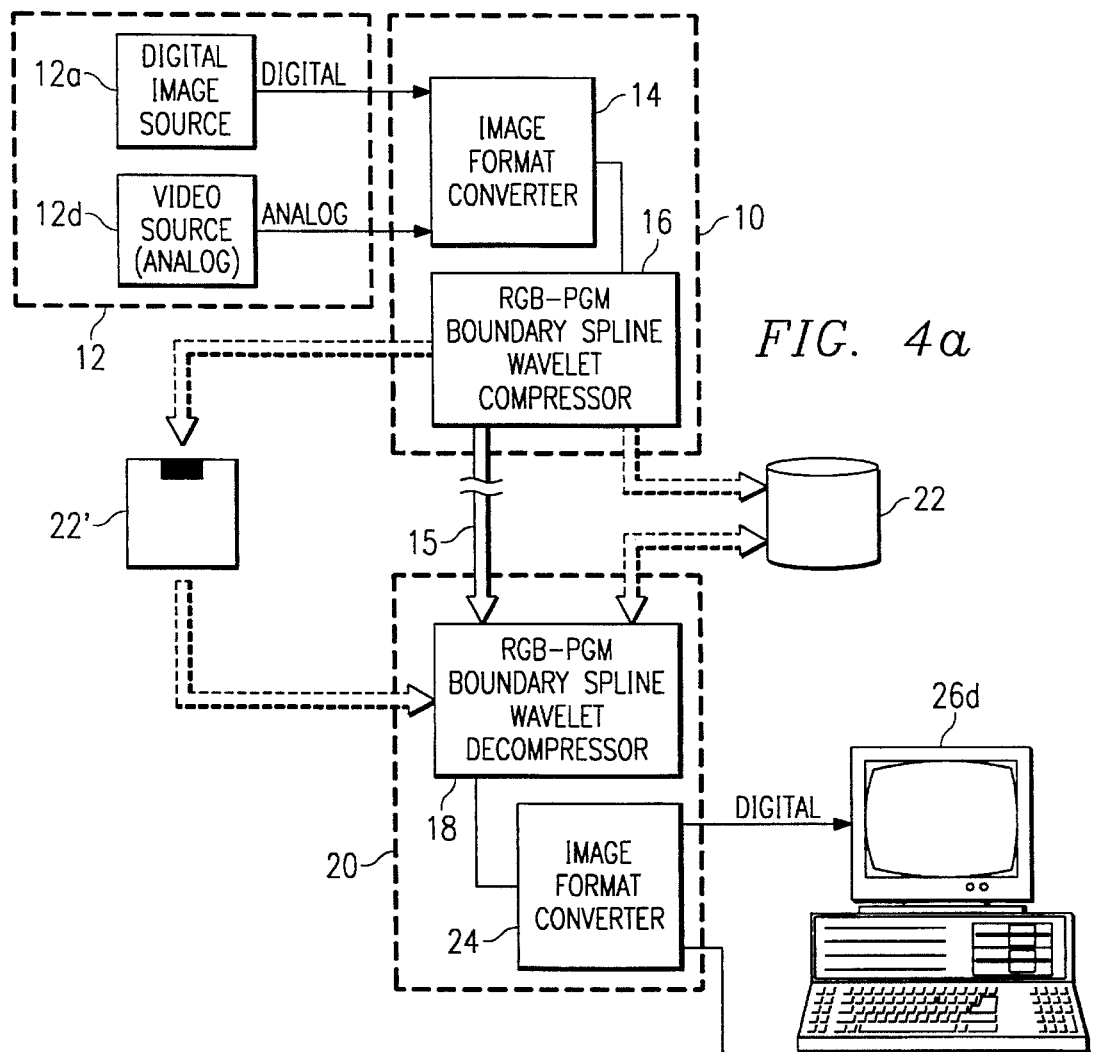
FIG. 4a is an electrical diagram, in block form, of a system for producing and communicating or storing compressed video image information according to the preferred embodiment of the invention.

Referring now to FIG. 4a, the construction of a video communication system 8 according to the preferred embodiment of the invention will now be described in detail. In this embodiment, system 8 is specifically designed for communicating compressed motion picture data; it is of course contemplated that system 8 may alternatively be used to communicate compressed data representative of a series of still video images. In addition, as will be described in further detail hereinbelow, system 8 may alternatively or also be used for archival storage of motion picture or still video image data, and the subsequent retrieval and display thereof.

As shown in FIG. 4a, in the context of video data communication, the transmission end of system 8 includes video source 12 and compression system 10, while the receiving end of system 8 includes decompression system 20 and video display 26. As illustrated in FIG. 4a, video source 12 may include digital video source 12d which may be a conventional device such as a CD-ROM drive, scanner, digital electronic network connection, or similar unit, or alternatively may be a computer storage unit such as a disk that contains digital video information. Video source 12 may also or instead include analog video source 12a, which may be a video camera, VCR unit, television broadcast or cable receiver, or another conventional source of analog video information. In any case, video source 12 provides digital or analog signals indicative of the images to be communicated or stored by the system of FIG. 4a.

Communication network system 15 is a conventional analog transmission or electronic digital communications network, or both an analog and digital network when including the appropriate clusters, analog-to-digital and digital-to-analog converters, and other necessary apparatus. Network 15 may be realized according to any conventional technology, including hard-wired cable, fiber optic cable, broadcast or satellite transmission, and the like. It is further contemplated that network 15 may be implemented merely by the physical transportation of portable media 22' such as floppy diskettes, CD-ROMs and the like. Regardless of the implementation, network 15 is connected between compression system 10 and the input of decompression system 20 to communicate compressed video image data therebetween.

It is specifically contemplated that the video data transmission effected from compression system 10 may be of the broadcast type, such that a single transmission end (source 12 plus compression system 10) may communicate simultaneously or in sequence to multiple receiving ends (decompression system 20 and display 26). For example, compression system 10 may be located at a television or movie studio, or at a local cable television system "head-end", with multiple receiving ends (decompression system 20 and display 26) located at homes, offices, or local theaters, depending upon the particular transmission being effected.

FIG. 4a also illustrates the optional use of system 8 in the context of the archival storage of motion picture or still video image data, and its later retrieval and display thereof. Disk storage unit 22 is coupled to receive the compressed video data from compression system 10 for storage. An example of disk storage unit 22 is a large disk (e.g., having capacity on the order of 1000 Gigabytes); alternatively, or in addition to the large disk unit, disk storage unit 22 may be associated with a mainframe or supercomputer to provide services such as on-line collection of video images into a library form. Disk storage unit is also coupled to decompression system 20, which is operable in this context to receive compressed video data therefrom for display on video display 26. The subsequent retrieval of the archived information in disk 8 may be made via a digital communications network (such as network 15 described hereinabove), or alternatively by way of a portable data storage medium such as a tape or diskette.

Compression system 10 includes data format converter 14 that is functionally connected between video source 12 and compressor/coder 16. Format converter 14 is of conventional construction as used to convert the format of the video image data from video source 12 into the format suitable for compression by compressor 16. In the example described hereinbelow, the format utilized by compressor 16 is eight-bit Portable Grey Level (PGM), although fewer than eight bits may be used in the PGM format, depending upon the available hardware devices and architecture. For color images, the format is RGB-PGM, where each of the red, green and blue color components is separately stored and communicated in PGM format. The PGM image format will be described in further detail hereinbelow. Accordingly, format converter 14 converts the image data from video formats such as PCX, IMG, GIF, TIF, RLE, NTSC, PAL, and the like into PGM or RGB-PGM format. Of course, if the output from video source 12 is already in PGM or RGB-PGM format, format converter 14 is unnecessary, and compressor 16 may directly receive the data from video source 12.

Figure 4B:
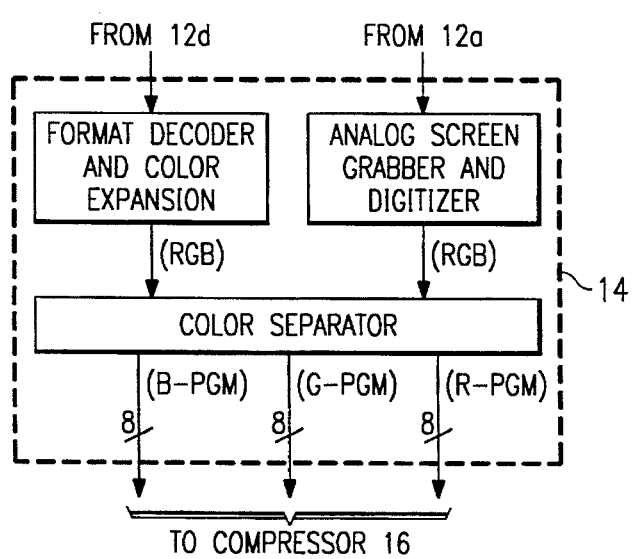

Referring now to FIG. 4b, the construction of format converter 14 according to the preferred embodiment of the invention will be described in detail, for the example where the output provided by format converter 14 is in RGB-PGM format. As noted above, format converter 14 can receive video data from either analog or digital video sources 12a, 12d, respectively, and as such two input ports are provided to format converter 14 along with two functional devices to reformat the received data into the desired format.

In the example of FIG. 4b, digital video image data presented by digital video source 12d is received by format decoder and color expansion device 21. The format decoder portion of device 21 decodes the data from the format presented by source 12d, such format being PCX, IMG, TIF, GIF, RLE, YUV, etc., into a color matrix, or color palette table, representation of the image signal. Format decoder circuitry is well known in the art, such as described in Rimmer, *Supercharged Bitmapped Graphics* (Windcrest/McGraw Hill). This decoding is followed by a color expansion operation performed by device 21, such that the output therefrom is in raw RGB format, with each pixel represented by successive bytes of red, green and blue color components. Conventional circuitry for performing such color expansion is readily available in the field, including such devices as color palette RAMs. The output of format decoder and color expansion device 21 is presented to color separator 25.

On the analog side, analog video information is presented by analog video source 12a to analog screen grabber and digitizer device 23. Device 23 first converts the analog input data from its NTSC or PAL format, by the screen grabber capturing the input screen data. Device 23 then digitizes each pixel of the captured screen, in the conventional manner. Conventional circuitry for performing the screen grabbing and digitizing functions may be used to implement device 23. The output of device 23 is also in the raw digital, or binary, RGB format as presented by device 21.

Color separator 25 is a conventional digital filter for separating the raw binary RGB signal presented by either of devices 21, 23 into RGB-PGM format. As is well known in the art, the RGB-PGM video data format includes, for each pixel, three eight-bit components. These three eight-bit components correspond to the intensity of the red, blue and green colors, respectively, to be displayed for that pixel. Of course, other byte widths may be used to digitally represent the intensity of each color component.

The RGB-PGM format used in this preferred embodiment of the invention decomposes the input video image into three screen representations, one for each of the red, blue and green color components. Each pixel location in the input image is thus represented by a pixel value in each of the red, blue and green decompositions, indicating the intensity of that color component at that pixel location of the image. In the eight-bit PGM format, the intensity of each color component for each pixel can thus range from 0 (black, or no intensity) to 255 (full intensity). The eight-bit PGM format is particularly convenient for processing by microprocessors or computers using ASCII coding and programming environments, as the fundamental storage unit is the byte in these environments.

The three channels of RGB-PGM data produced by color separator 25 is then presented to compressor 16, either sequentially or in parallel, for compression as will be described hereinbelow. According to this embodiment of the invention, each of the R, G, B components are compressed, decompressed, and otherwise processed separately from the other components for that image.

Of course, if the data presented by video source 12, specifically digital video source 12d, is already in RGB-PGM format, format converter 14 is not necessary in the system of FIG. 4a.

Compressor 16 includes the necessary compression circuitry, an example of which is described in detail hereinbelow, for compressing the formatted digital data according to the boundary-spline-wavelet technique that is also described in detail hereinbelow. Compressor 16 may also include coding circuitry for formatting the compressed data into the suitable format for communication over network 15 (or storage in disk 22). As will also be described in further detail hereinbelow, specific information regarding attributes of the communicated or stored information may be specifically included in the data coded by compressor 16.

Similarly, decompression system 20 includes decompressor 18 coupled to network 15 (or to disk 22, as the case may be). Decompressor 18 receives the transmitted or stored image data, reformats it into a form suitable for decompression, if necessary, and decompresses the data. Decompressor 18 in this embodiment of the invention communicates the decompressed image data to format converter 24, which converts the decompressed data to the appropriate format for display by display 26.

As illustrated in FIG. 4a, display 26 may be implemented as a digital display 26d, to which digital data may be directly applied thereto; alternatively, display 26 may be implemented as a conventional analog display, with the appropriate NTSC or other analog video format data applied thereto. According to this example, the output data from decompressor 18 is in PGM or RGB-PGM format, and thus format converter 24 will convert the PGM data into PCX, IMG, GIF, TIF, RLE, NTSC, PAL, RGB, or another display format. Of course, if digital display 26d is used and is capable of receiving and directly displaying PGM format data, format converter 24 is unnecessary.

2. Construction of the Compressor

Figure 5:
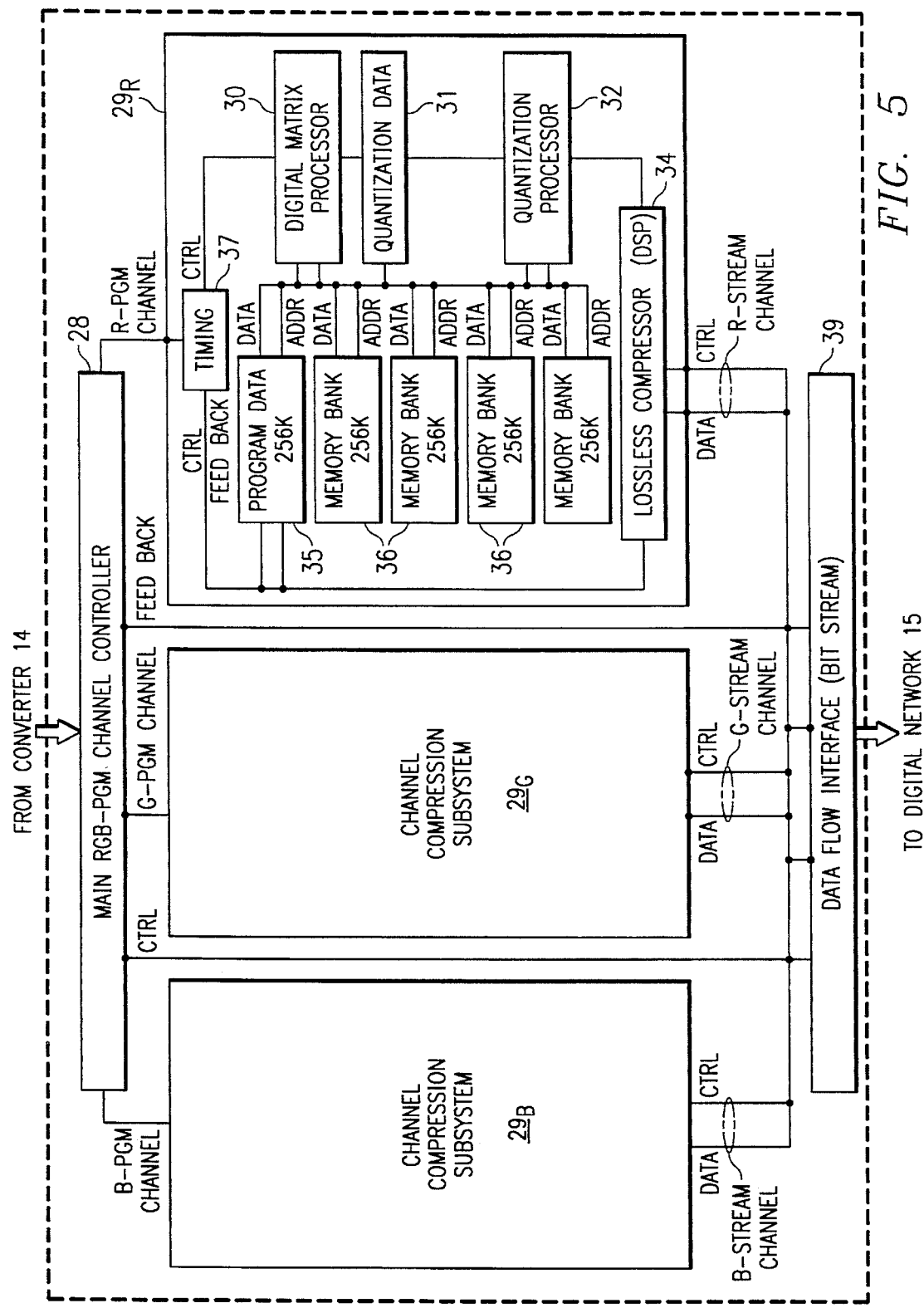
FIG. 5 is an electrical diagram, in block form, of a compressor according to the preferred embodiment of the invention.

Referring now to FIG. 5, the construction of compressor 16 according to the preferred embodiment of the invention will now be described in detail. It is, of course, contemplated that other architectural arrangements of circuitry may be used in the compression of video data according to the present invention. Specifically, it is contemplated that a conventional general purpose computer system may be capable of performing the compression of the video image data according to the present invention. However, the example of FIG. 5 incorporates a preferred embodiment of the circuitry for performing the data compression functions to be described herein.

In this example, compressor 16 preferably includes one main RGB-PGM channel controller 28 and three substantially identical channel compressor subsystems $29_R$, $29_G$, $29_B$ (collectively or generically referred to as subsystems 29). Three channel compressor subsystems $29_R$, $29_G$, $29_B$ are provided according to this embodiment of the invention, considering the separation of the input video data into the three component channels by format converter 14 described hereinabove. Compressor 16 also preferably includes data flow interface 39, for receiving data from each of channel compressor subsystems 29 and presenting the same to network 15.

Main controller 28 receives the three channels of RGB-PGM data from format converter 14, and forwards each channel of data separately to the appropriate channel compressor subsystem $29_R$, $29_G$, $29_B$. Alternatively, compressor 16 may be implemented to have only a single channel compressor subsystems 29 which processes each channel of data sequentially, in which case main controller 28 would control the sequential forwarding of image data to the single compressor subsystem 29.

Main controller 28 is connected by way of the appropriate bidirectional buses and control lines to control the functions within compressor 16. In addition to its control of subsystems 29, main controller 28 also controls the timing, feedback and sending operation of compressor 16, including control of the data flow interface 39. As such, main controller 28 is preferably a general purpose programmable microprocessor or other central processing unit (CPU) of sufficient computational power and capacity to process some or all of the image data and to control the performing of the image compression functions to be described hereinbelow. It is contemplated that microprocessors having performance levels similar to or greater than those of the 80486 type (including those available from Intel Corporation or Cyrix Corporation), of the 68040 type (including those available from Motorola), and of the SPARC processor type (available from Texas Instruments Incorporated or Sun Microsystems, Inc.) will be suitable for use as main controller 28 in compressor 16.

The construction of channel compressor subsystems 29 will now be described in detail relative to the construction of subsystem $29_R$ as shown in FIG. 5; it is contemplated that the other subsystems $29_R$, $29_G$ will be similarly constructed. Each channel compressor subsystem 29 according to this embodiment of the invention is specifically designed to perform the functions of boundary spline wavelet decomposition, quantization and lossless compression, as used in the compression operation according to this embodiment of the invention.

Channel compressor subsystem 29 according to this embodiment of the invention includes the circuit functions of digital matrix process 30, timing circuit 37, quantization processor 32, lossless compressor 34, program data memory 35, and multiple memory banks 36 for storage of image data.

Timing circuit 37 performs the functions of receiving the PGM format channel data from main controller 28 and forwarding the received data to memory banks 36 in its subsystem 29. In addition, timing circuit 37 controls the timing and feedback among the other functional components of channel compressor subsystem 29, including the matrix operations performed by digital matrix processor 30, quantization performed by quantization processor 32, lossless compression performed by lossless compressor 34, and accesses to memory 35, 36.

Digital matrix processor 30 is a processing circuit of conventional architecture that is specifically suitable for performing vector and matrix operations as used in the decomposition of image data according to the preferred embodiment of the invention, as will be described in detail hereinbelow. As will be apparent from the description below, these operations include the retrieval of pre-calculated matrices from program data memory 35, the matrix operations utilized in performing boundary-spline-wavelet decomposition of the video channel data, and storage of the results in memory banks 35. Examples of presently available components suitable for use as digital matrix processor 30 include digital signal processors such as the i860 processor available from Intel Corporation and the TMSC40 digital signal processor available from Texas Instruments Incorporated, and also general purpose microprocessors such as those of the 80386 and 80486 families available from Intel Corporation, and of the 68030 and 68040 families available from Motorola.

Quantization processor 32 is a logic circuit for filtering the data corresponding to decomposed images in order to achieve the desired compression ratio. It is contemplated that conventional processing circuitry or custom logic circuitry for performing this function in the manner described hereinbelow, will be readily apparent to one of ordinary skill in the art. According to this preferred embodiment of the invention, quantization processor 32 may be selectably controlled to perform the quantization process according to various selectable modes. These modes are selectable by way of quantization mode register 31, which stores a three digit code defining the type of quantization to be performed by quantization processor 32. An example of the codes storable in quantization mode register 31 and their corresponding quantization modes are as follows:

0: No quantization
1: thresholding
2: scalar quantization
3: JPEG quantization (i.e., using tables)
4–7: reserved for other quantization modes (e.g., vector quantization)

Lossless compressor 34 may be implemented by way of a conventional digital signal processor such as the TMSC40, programmed in such a manner as to perform lossless decompression upon the results of the quantized output from quantization processor 32. The lossless decompression performed by lossless decompressor 34 is according to the desired conventional technique, such as Huffman encoding, adaptive Huffman encoding, arithmetic encoding, LSQ coding, and the like. Alternatively, lossless compressor 34 may be implemented as a custom logic circuit for providing this function. The output of lossless compressor 34 is preferably compressed data for the channel (R, G, B) in bitstream format, for application to data flow interface 39.

Data flow interface 39 provides an interface between compressor 16 and network 15, and as such must gather the bitstream output from lossless compressors 34 in each of the subsystems 29 and arrange the same into a suitable format for transmission. Data flow interface 39 also provides a feedback signal to main controller 28 upon transmission of a frame of compressed data, based upon which main controller 28 may commence the processing of the next image frame to be compressed.

The preferred format in which the output compressed data from data flow interface 39 is communicated over network 15 will be described in further detail hereinbelow.

This example of compressor 16 is intended to support the compression of high definition real-time true color video image data, where "true color" indicates the use of twenty-four bits of color information for each pixel, resulting in 16.7 million possible colors. The frame rate for compressor 16 is intended to be on the order of thirty frames per second, so as to support "real-time" video image compression.

As noted above, if the color and frame rate requirements are reduced from real-time true color video, it may be possible to implement compressor 16 as a single channel, i.e. with a single channel compression subsystem 29. In this implementation, color data could be compressed sequentially for the R, G and B components of the RGB-PGM input data, under the control of main controller 28.

3. Boundary-Spline-Wavelet Video Image Data Compression

Referring now to FIG. 6, a method of compressing video image data according to the preferred embodiment of the invention will now be described in detail. It is contemplated that the architecture of compressor 16 of FIG. 5 and described hereinabove is particularly suitable for the performing of this method, although it is further contemplated that other computer architectures and arrangements may alternatively be used to perform the process of FIG. 6.

The flow chart of FIG. 6 corresponds to the compression of a single frame of video image data. Accordingly, for the compression of a motion picture, the process of FIG. 6 is performed sequentially for each frame of the motion picture. In the case of still image compression, of course, the process of FIG. 6 is performed for each image.

The process of FIG. 6 begins with the conversion of the video image data for the frame into the desired format for compression which, according to this preferred embodiment, is the well-known PGM format. As discussed above relative to FIG. 4a, this conversion is preferably performed by format converter 14, allowing compressor 16 to be dedicated to the compression process. As noted above, the PGM (Portable Grey Level) format expresses each picture element ("pixel") as a numerical value corresponding to its brightness; for eight-bit PGM, the values range from 0 to 255. Color images may be expressed in a mode referred to in the art as RGB-PGM, where a PGM image is provided for each of the red, green and blue color components of the image. It is believed that the RGB-PGM format is the most adaptable format for processing of color image data by way of the present invention, as it directly provides "true" color display information for high performance display systems, and is also readily adaptable for conversion to color look-up table ("color palette") display systems.

After conversion by format converter 14, the RGB-PGM image data is separated into separate R, G, B channels by main controller 28. This allows each of channel compression subsystems 29 to compress the image data in the manner described hereinbelow in parallel with one another. Of course, if a monochrome image is being compressed, only a single subsystem 29 is necessary; alternatively, if the compression rate allows, a color image may be compressed by sequentially compressing the separate R, G, B channel image data.

a. Boundary-Spline-Wavelet Decomposition

After channel separation by main controller 28, a frame of PGM image data is stored in memory banks 36 in subsystem 29 in a row-based order, arranged from top left to bottom right of the image. Each PGM image frame is then processed by boundary-spline-wavelet decomposition, indicated by process 40 of FIG. 6. FIG. 7 is a detailed flow chart of process 40 according to the preferred embodiment of the invention, to which attention is now directed. The compression method of FIG. 7 will be described relative to a single channel (R, G, or B), as it will be understood by those of ordinary skill in the art that a full color image will be compressed by the parallel or sequential compression of the other color channels in similar fashion.

The boundary-spline-wavelet decomposition of process 40 may operates upon individual blocks of pixels of the PGM frame, such as blocks of pixels that may be as small as eight-by-eight pixels, or as large as on the order of 1024-by-1024 pixels or greater. Process 48 indicates that the operation of each subsystem 29 will be performed upon the PGM frame in subdivided blocks. One of the important benefits of the present invention is that the size of the blocks defined in process 48 depends primarily upon the architecture of subsystems 29 in compressor 16 and of digital matrix processor 30 therein, but is not dictated by considerations of picture quality. This is because the boundary-spline wavelets used in the decomposition eliminate inaccuracies in the displayed data resulting from boundary effects.

Alternatively, if the computing capacity of digital matrix processor 30 and subsystems 29 is adequate, an entire frame may be decomposed in process 40 without dividing the image into smaller blocks of pixels. The present invention will still provide important benefits due to the elimination of boundary effects and inaccuracies around the edge of the image that would otherwise be present if unbounded wavelets were used. In addition, regardless of whether the image is divided into smaller blocks, the elimination of boundary effects according to the present invention also enables magnification of the image to be performed after decompression, without the limitations and artifacts that would otherwise be present.

Following division of the frame into the appropriate image blocks, the decomposition of process 40 continues with processes 50, 52 in which boundary-spline-wavelet decomposition is performed upon the image block, according to this embodiment of the invention. As will be described in detail herein, according to the preferred embodiment of the invention, the decomposition of process 40 is performed utilizing the wavelets described in the Chui and Quak paper cited hereinabove and incorporated by reference hereinto, and illustrated in FIGS. 3a through 3d discussed above. Process 50 first decomposes each horizontal row of the image block into two equal numbers of components of low-frequency (low-pass) and high-frequency (band-pass), and is followed by process 52 in which each vertical column of each of the low-frequency and high-frequency results of process 50 are again decomposed into two equal numbers of components of low-frequency and high-frequency.

Referring now to FIG. 8 in combination with FIGS. 9a through 9c, decomposition processes 50, 52 will now be described in further detail. FIG. 8 illustrates a frequency domain representation of function $\hat{f}_N$, and which corresponds to image block 51 of FIG. 9a that represents the discrete function $f_N(x,y)$. The discrete function $f_N(x,y)$ is a functional representation of image block 51 in PGM format, such that each value "x" in FIG. 9a is a digital value corresponding to image brightness at a position (x,y). In this example, image block 51 is eight pixels square.

As shown in FIG. 8, process 50 of FIG. 7 decomposes the function $\hat{f}_N$ into a low-frequency or low-pass component $\hat{f}_{N-1}$ and a high-frequency or band-pass component $\hat{g}_{N-1}$. According to the preferred embodiment of the invention, process 50 performs such decomposition for each horizontal row of image block 51, so that the result of process 50 is a matrix 53 that includes, for each row, a low frequency portion $f_{N-1}(x,y)$ and a high frequency portion $g_{N-1}(x,y)$. In other words, the decomposition of process 50 is performed considering the image data for each row of image block 51 as a one-dimensional spatial function in the x-dimension.

As discussed hereinabove, the decomposition of process 50 is performed according to boundary-spline-wavelet decomposition techniques, so that boundary effects are eliminated in the resulting frame. Accordingly, for each horizontal row of image block 51, the low frequency component $\hat{f}_{N-1}$ (or $f_{N-1}(x,y)$ in the spatial domain) in the corresponding row of decomposed image block 53 is a spline interpolation of the spatial data of image block 51. The high frequency component $\hat{g}_{N-1}$ (or $g_{N-1}(x,y)$ in the spatial domain) in the corresponding row of decomposed image block 53 corresponds to the boundary wavelets applied to the spatial data of that row of image block 51.

Referring back to FIG. 5, according to the preferred embodiment of the invention, it is contemplated that the decomposition of process 50 is performed by digital matrix processor 30 by way of a matrix algebra technique. According to this matrix technique, the decomposition of process 50 is intended to calculate the matrices $c^{N-1}$, $d^{N-1}$ according to the following relationship:

$$\hat{f}_N = \hat{f}_{N-1} c^{N-1} + \hat{g}_{N-1} d^{N-1} \qquad [32]$$

where $c^{N-1}$ and $d^{N-1}$ are matrices of coefficients of the low-frequency and high-frequency components of the input signal, respectively.

Figure 10:
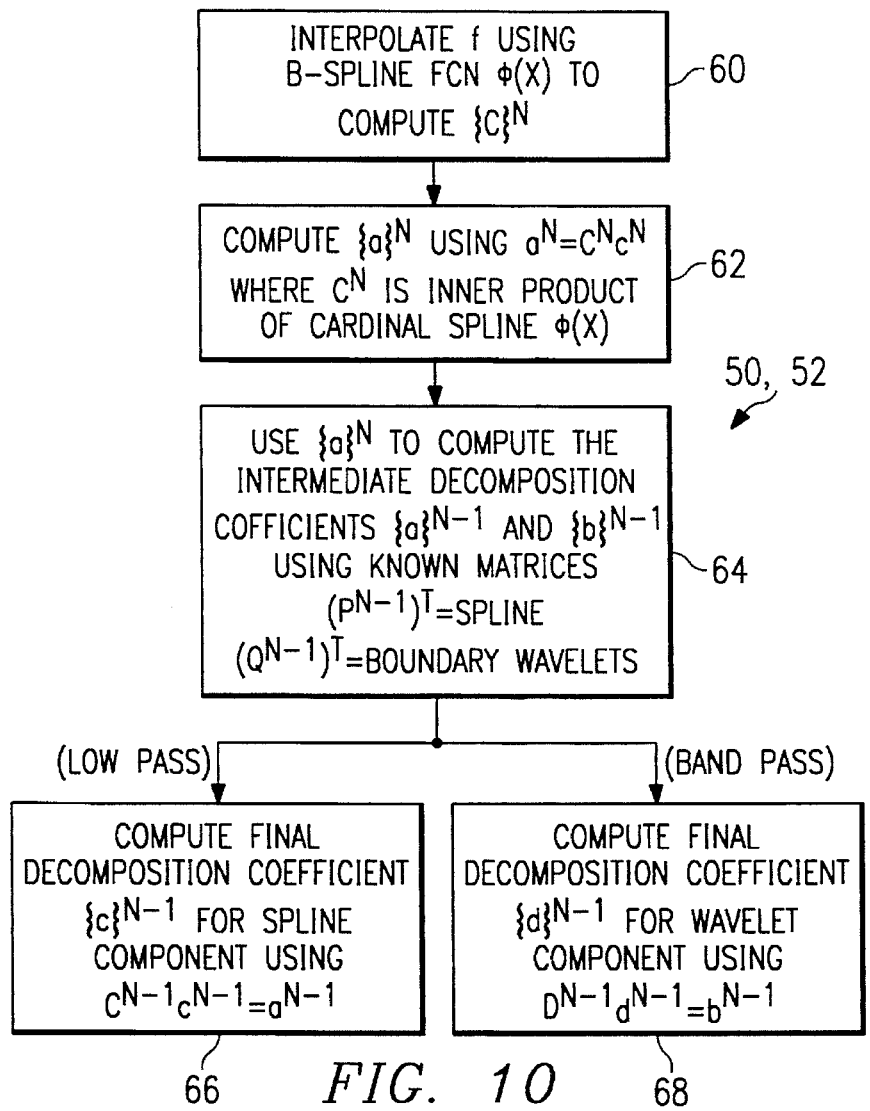
FIG. 10 is a flow diagram of a preferred matrix algebra technique for performing the boundary-spline-wavelet decomposition of FIG. 7.
Figure 11:
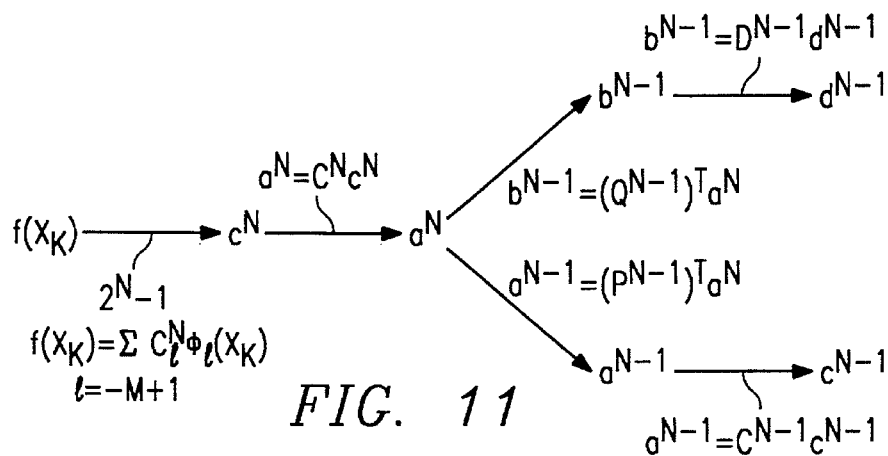
FIG. 11 is a chart illustrating the relationship of the matrices in the process of FIG. 10.

Attention is directed to FIGS. 10 and 11 in combination for a detailed description of this technique. FIG. 10 is a flow chart illustrating the matrix algebra procedure for performing processes 50 and 52 of FIG. 7 (the algebra being the same in each case). FIG. 11 is a chart illustrating the relationship among the decomposition matrices used in performing processes 50, 52 according to the flow chart of FIG. 10.

As shown in FIG. 10, the first step of the decomposition begins with the process 60 which interpolates the function f, for each horizontal row, using a B-spline function $\phi(x)$, to provide a matrix representation $\{c\}^N$ of the input image block 51 using the following relationship:

$$y_k = f(x_k) = \sum_{l=-m+1}^{2^N-1} c_l^N \phi_l^N(x_k); \qquad [33]$$

$$k = 1, 2, \ldots, 2^N - m + 1$$

where m is the degree of the spline, where k is the number of sample points within the interval (i.e., the length of the row of image block 51, in pixels), and where the B-spline function $\phi_k^j(x)$ is of the form:

$$\phi_k^j(x)=2^{j/2}\phi(2^jx-k) \quad [34]$$

According to the preferred embodiment of the invention, it has been observed that the accuracy of the decomposition and the stability of the result of odd degree splines (i.e., linear, cubic, etc.) is improved relative to even degree splines (i.e., quadratic). As such, it is preferred that m, in equation [31] be an odd number (m=1, 3, 5, ... ).

Upon determining the matrix $c^N$, process 62 (FIG. 10) is then next performed to compute the coefficients of a matrix $\{a\}^N$, using the relationship $a^N=C^Nc^N$. According to this preferred embodiment of the invention, the matrix $C^N$ is the inner product of the cardinal spline function $\phi(x)$:

$$C^N=(<\phi_k^j,\phi_l^j>)_{k,l=-3}^{2^j-1} \quad [35]$$

The calculation of process 62 returns the matrix $a^N$, as shown in FIG. 11.

Process 64 is then performed in order to compute intermediate decomposition coefficients utilizing the spline and boundary-wavelet concepts. These intermediate decomposition coefficients are also obtained by way of matrix algebra using digital matrix processor 30 of compressor 16, shown in FIG. 5. For the low-frequency, low-pass, or spline component, the intermediate decomposition coefficients $a^{N-1}$ are calculated using the following matrix operation:

$$a^{N-1}=(P^{N-1})^Ta^N \quad [36]$$

where $P^{N-1}$ is a known matrix that contains coefficients of the B-spline to be applied to the input image block, and which has the following form:

$$P^N=\{p_{k,l}^N\}_{l=-m+1,k=-m+1}^{2^{j+1},2^j-1} \quad [37]$$

The elements p of the matrix of equation [37] are defined as follows:

$$P_{k,l}^N=\frac{B_{m,l}^o\left(\frac{k+m-1}{2}\right)-\sum_{i=k+1}^{i_1}P_{i,l}^NB_{m,i}^o(k+m-1)}{B_{m,k}^o(k+m-1)} \quad [38]$$

for l from $-m+1$ to $-1$, and for k from $m+21$ to $-m+1$, where $B^o_{m,i}$ represents the B-spline of order m, on the zeroth level and with ith initial knot.

For the high-frequency, band-pass, or wavelet component of the row of the image block 51, the intermediate decomposition coefficients $b^{N-1}$ are calculated using the following matrix operation:

$$b^{N-1}=(Q^{N-1})^Ta^N \quad [39]$$

where $Q^{N-1}$ is a known matrix containing coefficients of the boundary-wavelets to be applied to the input image block, and having the form:

$$Q^N=\{q_{k,l}^N\}_{l=-m+1,k=-m+1}^{2^{j+1}-1,2^j-m} \quad [40]$$

where the elements q of the matrix are defined as follows:

$$q_{k,l}^N=\frac{\sum_{i=i_3}^{i_4}\alpha_{l,i}B_{2m,i}^{0(m)}(k+m-1)-\sum_{i=k+1}^{i_2}q_{i,l}^iB_{m,i}^o(k+m-1)}{B_{m,k}^o(k+m-1)} \quad [41]$$

for l from $-m+1$ to $-1$, and for k from $3m-2+21$ to $-m+1$, and where $B^o_{m,i}$ represents the B-spline of order m on the zeroth level and with ith initial knot. In equation [41], the values $i_2$, $i_3$, $i_4$ are defined as follows:

$i_2$=min (3m–2+21, k+m–2)

$i_3$=max (–m+1, k–m)

$i_4$=min (2(1+m–1), k+m–1)

By way of explanation, the sum of the e terms in equation [41] corresponds to the boundary wavelets for those points in image block 51 that are near the edges, and the sum of the q terms in equation [41] corresponds to the inner wavelets for those points in image block 51 that are away from the edges.

According to the preferred embodiment of this invention, each of the matrices $C^N$, $P^{N-1}$ and $Q^{N-1}$ are pre-calculated and stored in program data memory 35 in each channel compression subsystem 29, in a manner accessible by digital matrix processor 30, so that the matrix operations 62, 64 of FIG. 10 can be readily and rapidly performed. The Appendix to this specification specifies examples of these matrices $C^N$, $P^{N-1}$ and $Q^{N-1}$ which have actually been used for decomposition of an image block of a size 256 pixels square, and where the numeric representation of matrices C, P and Q in the Appendix are given for the cubic (m=4) case.

Upon obtaining the intermediate decomposition coefficients in process 64, the final decomposition coefficient matrices $c^{N-1}$ and $d^{N-1}$, for the low-pass (spline) and band-pass (wavelet) components, respectively, are obtained by processes 66, 68, respectively. According to this preferred embodiment of the invention which utilizes matrix algebra, process 66 obtains the final low-pass decomposition coefficient matrix $c^{N-1}$ from the relationship:

$$a^{N-1}=C^{N-1}c^{N-1} \quad [42]$$

where the matrix $C^{N-1}$ is the inner product of the cardinal spline function $\phi(x)$, calculated according to equation [35] noted above for the next matrix in sequence. The values of the matrix $c^{N-1}$ correspond to the values in the low-frequency portion of processed image block 53 of FIG. 9b, and thus represent the function $f_{N-1}(x,y)$ in the spatial domain. Matrix $c^{N-1}$ therefore also represents the frequency domain representation $\hat{f}_{N-1}$ shown in FIG. 8.

Similarly, process 68 of FIG. 10 determines the final decomposition coefficient matrix $d^{N-1}$ for the band-pass component of the image block 51. Process 68 is based upon the operation:

$$b^{N-1}=D^{N-1}d^{N-1} \quad [43]$$

where matrix $D^{N-1}$ is a known matrix that may be precalculated according to the relationship:

$$D^N=(Q^N)^TC^{N+1}(Q^N) \quad [44]$$

and is thus based upon known relationships. Upon completion of process 68, the matrix $d^{N-1}$ corresponds to the high-frequency values in processed image block 53 of FIG. 9b. The matrix $d^{N-1}$ thus also represents the spatial function $g_{N-1}(x,y)$, and its corresponding frequency domain representation $\hat{g}_{N-1}$, which is the band-pass component shown in FIG. 8.

Upon completion of the horizontal decomposition of process 50, matrices $c^{N-1}$ and $d^{N-1}$ are stored in memory banks 36 of channel decomposition subsystem 29 preferably in the order illustrated in FIG. 9b as processed image block 53. Referring back to FIG. 7, process 52 is then performed to again decompose processed image block 53 in similar manner as process 50, only in a vertical direction, i.e., for each vertical column of processed image block 53, taken column-by-column. In other words, the decomposition of process 52 is performed considering the image data for each vertical column of processed image block 53 as a one-dimensional spatial function in the y-dimension. According to the preferred embodiment of the invention, the matrix algebra used in process 52 is identical to that shown in FIGS. 10 and 11, for the next level of matrices in sequence, except on a column-by-column basis for each vertical column in processed image block 53.

Process 52 thus decomposes the low-frequency spatial function $f_{N-1}(x,y)$ into a low-frequency portion "LL" and a higher-frequency portion "LH" contained within processed image block 55 as shown in FIG. 9c, where the second decomposition is performed on processed image block 53 in a vertical direction. FIG. 8 illustrates, in the frequency domain, that the matrix portion LL corresponds to the function $\hat{f}_{N-2}(\hat{f}_{N-1})$ that is the low-pass portion of the prior low-pass function $\hat{f}_{N-1}$, and that the matrix portion HL corresponds to the function $\hat{g}_{N-2}\hat{f}_{N-1}$ that is the band-pass portion of the prior low-pass function $\hat{f}_{N-1}$.

Similarly, process 52 decomposes the prior band-pass decomposition function $\hat{g}_{N-1}$ into a low-frequency (i.e., lower band-pass) portion ("HL" in FIG. 9c) and a high-frequency portion ("HH" in FIG. 9c), but where the second decomposition is performed on processed image block 53 in a vertical direction. Referring to FIG. 8, this decomposition provides frequency domain representation $\hat{f}_{N-2}\hat{g}_{N-1}$ corresponding to the HL portion of final processed image block 55, and frequency domain representation $\hat{g}_{N-2}\hat{g}_{N-1}$ corresponding to the HH portion of final processed image block 55.

The LL portion of final processed image block 55 corresponds to the "blur" image of the input video image block 51, and the LH, HL and HH portions of final processed image block 55 correspond to band-pass portions of the input video image block 51, taken in both the horizontal and vertical directions, successively. As is evident from the frequency domain representations of FIG. 8, the LH, HL and HH components correspond to the components of the image in increasing frequency bands, with the HH component corresponding to the highest frequency component.

The decomposition performed in processes 50, 52 described hereinabove provide important benefits in the field of video image decomposition. Firstly, the benefits of time-frequency localization of the signal in a manner in which the frequency-width of the window widens and the time-width of the window shrinks with increasing frequency provided by wavelet decomposition are obtained. This allows for more detailed and thorough analysis of rapidly changing portions of the signal, and thus a more accurate decomposition of the video image. Secondly, by using the boundary-spline-wavelet approach described hereinabove, boundary effects at the edges of the image or of subdivided image blocks within the image are eliminated. The elimination of these boundary effects allows for smaller capacity computers to perform the decomposition with no degradation in image quality. Elimination of boundary effects also enables each subdivided image to be processed independently by a stand-alone device or processor system, so that the entire decomposition may be performed by parallel processing or parallel computing, without extensive modifications. In addition, the decomposed image may, upon decompression, be magnified without the presence of boundary effect artifacts in the displayed image.

Numerical Decomposition Example

The decomposition of processes 50, 52 can be illustrated by way of a simple numerical example. In this example, the input image block is eight-by-eight pixels in size, and contains an eight-bit digital value representative of the display intensity at that location (i.e., is in PGM format). An example of the input image block in this format is as follows:

| 139 | 144 | 149 | 153 | 155 | 155 | 155 | 155 |
|-----|-----|-----|-----|-----|-----|-----|-----|
| 144 | 151 | 153 | 156 | 159 | 156 | 156 | 156 |
| 150 | 155 | 160 | 163 | 158 | 156 | 156 | 156 |
| 159 | 161 | 162 | 160 | 160 | 159 | 159 | 159 |
| 159 | 160 | 161 | 162 | 162 | 155 | 155 | 155 |
| 161 | 161 | 161 | 161 | 160 | 157 | 157 | 157 |
| 162 | 162 | 161 | 163 | 162 | 157 | 157 | 157 |
| 162 | 162 | 161 | 161 | 163 | 158 | 158 | 158 |

Process 50, as noted above, performs a boundary-spline-wavelet decomposition of the input image block, taken for each horizontal row. In this example, where a trivial zero degree (m=0) wavelet is used, for purposes of explanation, the horizontal decomposition of process 50 results in the matrix:

| 141.5 | 151 | 155 | 155 | −2.5 | −2 | 0 | 0 |
|-------|-----|-----|-----|------|-----|-----|---|
| 147.5 | 154.5 | 157.5 | 156 | −3.5 | −1.5 | 1.5 | 0 |
| 152.5 | 161.5 | 157 | 156 | −2.5 | −1.5 | 1 | 0 |
| 160 | 161 | 159.5 | 159 | −1 | 1 | 0.5 | 0 |
| 159.5 | 161.5 | 158.5 | 155 | −0.5 | −0.5 | 3.5 | 0 |
| 161 | 161 | 158.5 | 157 | 0 | 0 | 1.5 | 0 |
| 162 | 162 | 159.5 | 157 | 0 | 1.5 | 2.5 | 0 |
| 162 | 161 | 160.5 | 158 | 0 | 0 | 2.5 | 0 |

The portion of the above matrix on the left-hand side of the divider corresponds to the low-frequency portion of the input image, while the portion of the above matrix on the right-hand side of the divider corresponds to the high-frequency portion of the input image, both performed in a horizontal manner.

Process 52 then decomposes the result of process 50, considering the data in vertical columns as one-dimensional spatial sampled functions. Again using the same trivial zero-degree wavelet, the vertical decomposition of process 52 provides the result:

| 144.5 | 152.75 | 156.25 | 155.5 | −3 | −1.75 | 0.75 | 0 |
|-------|--------|--------|-------|-----|-------|------|---|
| 156.25 | 161.25 | 158.25 | 157.5 | −1.75 | −0.25 | 0.75 | 0 |
| 160.25 | 161.25 | 158.5 | 156 | −0.25 | −0.25 | 2.5 | 0 |
| 162 | 161.5 | 160 | 157.5 | 0 | 0.75 | 2.5 | 0 |
| −3 | −1.75 | −1.25 | −0.5 | 0.5 | −0.25 | −0.75 | 0 |
| −3.75 | −1.75 | −1.25 | −1.5 | −0.75 | −1.25 | 0.25 | 0 |
| −0.75 | 0.25 | 0 | −1 | −0.25 | −0.25 | 1 | 0 |
| 0 | 0.5 | −0.5 | −0.5 | 0 | 0.75 | 0 | 0 |

The orientation of the above matrix uses the nomenclature of FIG. 9c, as follows:

$$\frac{LL|HL}{LH|HH}$$

Video Image Decomposition Example

Figure 12A:
FIGS. 12a through 12e illustrate an example of a video image decomposed according to the preferred embodiment of the invention.
Figure 12B:
Figure 12D:
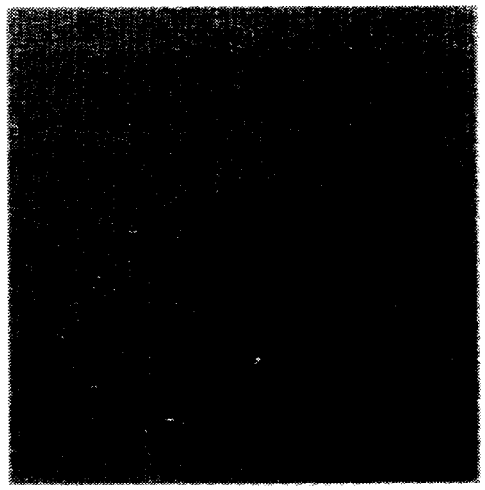
Figure 12C:
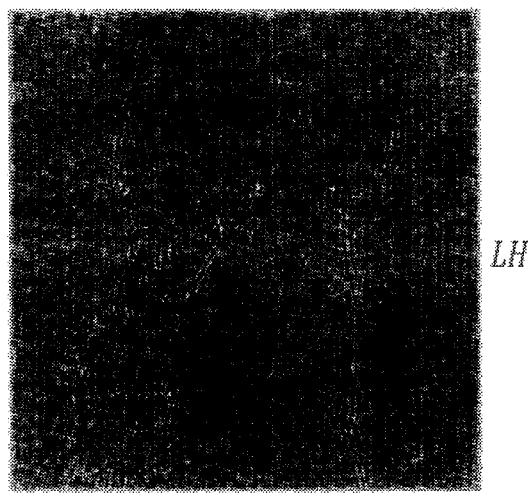
Figure 12E:
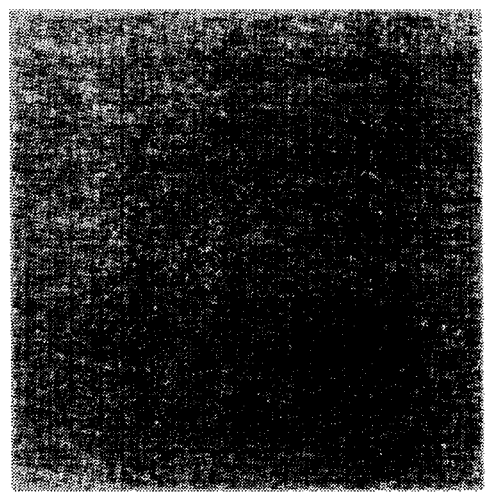

Referring now to FIGS. 12a through 12e, an example of the boundary-spline-wavelet decomposition according to the preferred embodiment of the invention as applied to an actual video image will be described. FIG. 12a illustrates an input video image in PGM format to which boundary-spline-wavelet decomposition is applied. FIGS. 12b through 12e illustrate the LL, LH, HL and HH components of the final processed video image after performing processes 50, 52 of FIG. 7, using the matrix operations described hereinabove relative to FIGS. 10 and 11. As is evident from FIG. 12b, the LL component is a quite faithful representation of the input image of FIG. 12a. In the LH, HL, HH components illustrated in FIGS. 12c through 12e, respectively, the visible striations correspond to higher frequency components of the input image.

b. Thresholding and compression

Referring back to FIG. 6, upon the completion of the horizontal and vertical decomposition of the input image block performed in process 40, process 42 is next performed by quantization processor 32 upon the results of the decomposition stored in memory banks 36.

Specifically, the LH, HL and HH components of the decomposition are subjected to thresholding and quantization in process 42, with no such quantization performed upon component LL. This selection of the LH, HL and HH components for quantization is based upon the observation that most real-world images in PGM format will consist of low-frequency intensities, and that the higher-frequency wavelet portions of the decomposition will tend to have a large number of small or zero coefficients. The numerical example set forth above relative to the decomposition of the eight-by-eight image illustrates this effect. In addition, the exemplary image of FIGS. 12a through 12e also shows that the LL component of the decomposition contains the most information, with the LH, HL and HH components containing only a small amount of significant information indicated by the striations therein.

According to the preferred embodiment of the invention, therefore, this large population of small values in the higher-frequency components after decomposition may be either discarded (or reduced in memory requirements) by the quantization of process 42. For example, with reference to the above numerical example, all coefficients having an absolute value less than 2.0 may be set to zero (thresholding), and all remaining coefficients may be rounded to their nearest signed integer value. The memory requirements for storage of the coefficients that undergo the thresholding and quantization are thus much reduced, even before the application of lossless compression techniques as will be noted below.

Other thresholding and quantization techniques may alternatively be applied to the decomposed image data, selectable according to the code stored in quantization data register 31 described hereinabove.

Video Image Quantization Example

Referring now to FIGS. 13a through 13c, an illustration of the result of thresholding performed in process 42 is illustrated, relative to the video image decompression example of FIGS. 12a through 12e. FIG. 13a is the same image as the LL "blur" component also shown in FIG. 12b. FIG. 13b illustrates, for example, the sum of the LH, HL and HH coefficients after the decomposition of process 40 of FIG. 7, and thus is the sum of the images of FIGS. 12c through 12e discussed above. FIG. 13c illustrates the sum image of FIG. 13b after the application of a threshold limit and quantization of process 42. As is evident from FIG. 13c, the higher frequency components LH, HL, HH from the decomposition of process 40 correspond only to the edges and other sharp transition locations of the input image.

c. Completion of Video Compression

Referring back to FIG. 6, after the thresholding and quantization of the LH, HL, HH components of the decomposed input image performed in process 42, decision 43 determines whether the desired compression ratio has yet been reached.

As illustrated particularly by the video and numerical examples noted above, upon the completion of a single decomposition process 40, the LL component of the image may be adequate to accurately convey the input image. This single decomposition of the image will provide up to a 4:1 compression ratio, depending upon the memory requirements for the quantized high frequency results. This maximum ratio considers that the wholesale discarding of the higher frequency components will leave only the LL component residing in a matrix that is one-fourth the size of the input image block. Specifically, therefore, decision 43 determines if the compression ratio achieved so far is adequate for the desired transmission or storage and, if not, passes control back to the decomposition process so that the LL component resulting from the prior decomposition may again be decomposed into four more components.

According to this embodiment of the invention, the determination of whether the desired compression ratio has been obtained may be done relative to a predetermined compression ratio. In such a case, timing circuit 37 will maintain a count of the number of passes through decomposition process 40, and will perform decision 43 by comparing the resulting compression ratio against a previously stored value.

Alternatively, the compression ratio and thus decision 43 may be determined in a dynamic manner, frame by frame, depending upon the accuracy with which the LL component is representative of the input frame image. Conceptually, such a determination will be a measure of the difference between the LL component and the input image block relative to a predetermined accuracy limit, such that if the LL decomposition is within a preselected $\epsilon$ limit, an additional pass through the decomposition process 40 may be performed. It is contemplated that this determination can be made automatically by main controller 28 in decompressor 16 so that the process performed in each of channel compression subsystems may remain consistent, by calculating a numerical value based upon the sum of the coefficients in the LH, HL, and HH components of the decomposed image, such sum indicating the difference between the input image to that pass of the decomposition process and the resultant LL component.

In the usual case, where each video image frame is subdivided into smaller image blocks for compression, it is preferred that the compression ratio be constant for all compressed image blocks of the frame. Accordingly, decision 43 is preferably performed after each image block has been decomposed and quantized in processes 40, 42, to allow the dynamic determination of whether to repeat the decomposition process 40 is made based on the worst case decomposed image.

According to this dynamic determination of decision 43, video image frames that do not contain high frequency information to any large extent, such as background images with smooth transitions between colors, may be compressed to a significantly higher ratio than can video image frames that do contain high-frequency information, or a large number of sharp transitions. Use of such dynamic compression can optimize the overall compression efficiency with minimal impact on the image quality.

Whether statically or dynamically determined, upon decision 43 returning the result that the desired compression ratio has been obtained, according to the preferred embodiment of the invention, lossless compression is then performed upon the results of the decomposed and quantized images for the frame, in process 44 of FIG. 6. Referring back to FIG. 5, the lossless compression of process 42 is preferably performed by lossless compressor 34 according to a conventional lossless technique such as Huffman encoding. The lossless compression of process 42 is especially beneficial in compressing the quantized higher frequency LH, HL, HH components from the decomposition, considering that non-zero or varying values in these components will be quite sparse for most video image frames.

After the lossless compression of process 42, the compressed video image data is formatted, or coded, on a frame-by-frame basis for transmission or storage, as the case may be. As noted above, it is contemplated that most video image frames will be compressed according to the preferred embodiment of the invention after subdivision into multiple image blocks, such that a complete frame will consist of multiple ones of such blocks, transmitted together. As illustrated in FIG. 4a, it is preferred that the coding of the compressed image data be performed within compressor 16, preferably by data flow interface 39 shown in FIG. 5, prior to its application to digital communications network 15.

Figure 14:
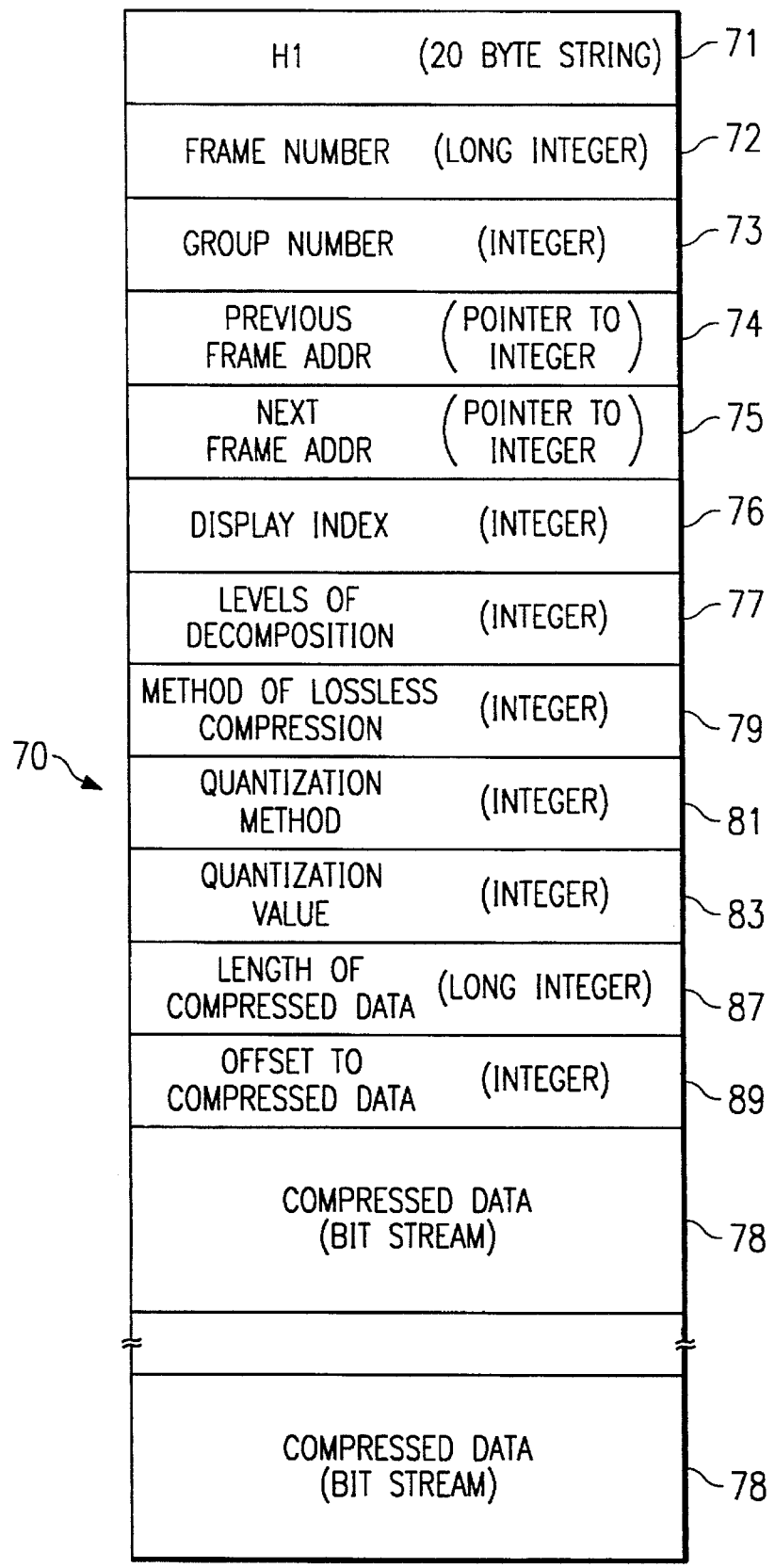
FIG. 14 is a diagram of the construction of a compressed video image frame for transmission according to the preferred embodiment of the invention.

Referring now to FIG. 14, a schematic illustration of formatted frame 70 of data according to the preferred embodiment of the invention will now be described. As will be described in further detail hereinbelow, the decompression of video image data compressed according to the present invention can occur very rapidly; for example, portions of motion pictures compressed according to the present invention have been decompressed and displayed on a real-time basis. This rapid and accurate decompression allows for the ability of enhanced features to be used in the display of the decompressed images. The construction of data frame 70 of FIG. 14 includes the compressed bit stream data corresponding to a video frame, plus the appropriate formatting "header" information to allow the enhanced features to be operable. The header portion of frame 70 preferably provides complete information to describe the frame and its position.

As illustrated in FIG. 14, frame 70 is a sequential block of data formatted for a storage device such as computer memory, disk storage, CD-ROM and the like. It is therefore contemplated that, in order to take advantage of all of the features of the present invention, compressed data frames 70 will be stored in a computer memory prior to its decompression, rather than decompressed in a real-time manner as received over digital network 15. Real-time decompression and display may alternatively be performed as the data is received, but certain ones of the features described hereinbelow will not be as useful in such a case. Since the extraction of the header information from frame 70 requires extremely little computing time and effort, inclusion of this header information will have substantially no penalty in the overall performance of the real time decompression and display.

The first portion of frame 70 is H1 header 71, which is data of string type used to specify the status of the bit stream compressed image, and as such may contain on the order of twenty bytes of data. For example, H1 header 71 may include an identifier of the movie of which the frame is a part, and may also contain a security code for preventing unauthorized viewing or use of the compressed data. For example, if the compressed video data corresponds to a movie being communicated over digital telephone lines, H1 header may contain a code corresponding to an identifier of a local decompression system 20 so that only that decompression system will be enabled to decompress the data. Field 72 of frame 70 is a four-byte field of long integer type which contains the number of its corresponding frame 70 to specify the position of the frame 20 in the entire video image sequence. Field 73 is a two-byte field of integer type which identifies the group of motion (if any) to which frame 70 belongs. A group of frames 70 may be designated as a group, such that the frames in the group cannot be separated from one another or cut from the entire sequence. Such grouping can prevent unexpected side effects in the display of the motion picture sequence.

Fields 74 and 75 then follow in frame 70 according to this example, to facilitate control of the display of the video sequence containing frame 70. Field 74 is a four-byte field of long integer type which contains the address at which the previous frame in the sequence begins, enabling rapid jumping back to the previous frame as desired. As will be described hereinbelow, a user control interface may be provided with decompressor system 20 to allow interactive control of the display of the video sequence, in which case field 74 will facilitate the skipping and selection of individual frames in reverse order. Similarly, field 75 is a four-byte field of long integer type which contains the address of the next frame in the sequence, allowing rapid skipping of frames 70 in the forward direction during decompression and display.

Field 76 is a two-byte field of integer type that indicates the complexity of the image contained within frame 70, by specification of compression ratio, quality index, or a user-defined specification of the image, such values useful in measuring and controlling the performance of the decompression and display.

Fields 77, 79, 81, 83 indicate certain parameters used in the compression of the video data for frame 70. The use of header information to communicate these parameters allow for decompression system 20 to have selectable capabilities, such that it can decompress video image data that were compressed according to different techniques. In addition, since each frame 70 includes these fields 77, 79, 81, 83, the provision of these fields according to the preferred embodiment of the invention enables dynamic compression, such that different compression techniques may be used on different frames 70 in the same video sequence. Field 77 is a two-byte field of integer type that specifies the level of decomposition in the compressed data of frame 70, so that decompression system 20 may perform the proper levels of decompression upon receipt. Field 79 is an integer field indicating the type of lossless compression performed by lossless compressor 34, for example:

0: no lossless compression

1: Huffman coding

2: adaptive Huffman coding and so on. Field 81 is a two-byte field of integer type that indicates the quantization mode used by quantization processor 32 described hereinabove relative to compression system 10, for example following the tabular listing of the codes noted above. Field 83 is a two-byte field of integer type that stores the quantization value used by quantization processor 32, and thus depends upon the mode indicated in field 81. Using the tabular example noted hereinabove for control of quantization processor 32, the value of field 83 will indicate the quantization value as follows:

| Mode # (field 81) | Field 83 represents: |
|---|---|
| 0 | 0 (don't care) |
| 1 | thresholding value |
| 2 | dequantizing scalar |
| 3 | address of the JPEG quantization table, as an offset from the compressed data |
| 4 | address of vector quantization table, as an offset from the compressed data |

As indicated in FIG. 14, portion 78 of frame 70 contains the compressed image data for field 70, and follows fields 87, 89. Field 87 is a four-byte field of long integer type that specifies the length of portion 78 containing the compressed data stream, and is useful in assisting the reading of the compressed data stream, such as by way of a DMA operation. Field 89 is a four-byte field of long integer type that indicates the offset distance between field 87 and the start of portion 78 containing the compressed image data; field 89 may thus be used to reserve space within frame 70 for other fields and information defined by the user or other developers.

Portion 78 contains a data stream of the compressed video image data for frame 70, as noted above. The length of portion 78 will, of course, depend upon the compression ratio obtained in the compression process, upon the number of pixels in the frame, and also upon the extent to which the lossless compression of process 44 compressed the higher frequency components of the frame. In addition, it is contemplated that audio information may also be encoded in a conventional manner, and placed within portion 78 of frame 70, to support the transmission or storage of sound motion pictures.

This arrangement of frame 70 is particularly useful in the interactive decompression and display of a sequence of video frames. Specifically, fields 74, 75 and 76 enable decompressor 20 to flexibly display the frames in the sequence, especially in the case where the sequence of frames 70 are sequential frames in a motion picture. For example, decompressor 20 can interrogate field 76 to determine if the processing capacity of decompressor 20 and its display system 26 is such that every frame in the sequence cannot be decompressed and displayed in real time; if so, decompressor 20 can skip to the next frame 70 in the sequence indicated by the contents of field 75 in frame 70. While the quality of the displayed motion picture will be reduced from the best possible images when frames are skipped, those frames that are not skipped are displayed in real-time, so that the time-dependence of the motion in the motion picture is accurately conveyed.

Fields 74, 75, 76 also provide interactive display capability. As field 74 indicates the address of the previous frame in the sequence, frame 70 allows the capability of backwards display of a motion picture, whether for each frame 70 in the sequence or with frames skipped as described above based on the time required for decompression and the capability of decompressor 18. In addition, the information provided by field 76 facilitates the synchronization of the display of the sequence of frames 70, and also allows for easy scaling of the time base to provide slow-motion or enhanced-speed display.

Accordingly, referring back to FIG. 6, the formatting or coding of process 46 thus prepares the compressed video image data for transmission over digital network 15 for storage, decompression and display by decompression system 20, or alternatively to disk unit 22 for archival storage.

4. Construction of the Decompressor a. High Performance Decompressor

Figure 15A:
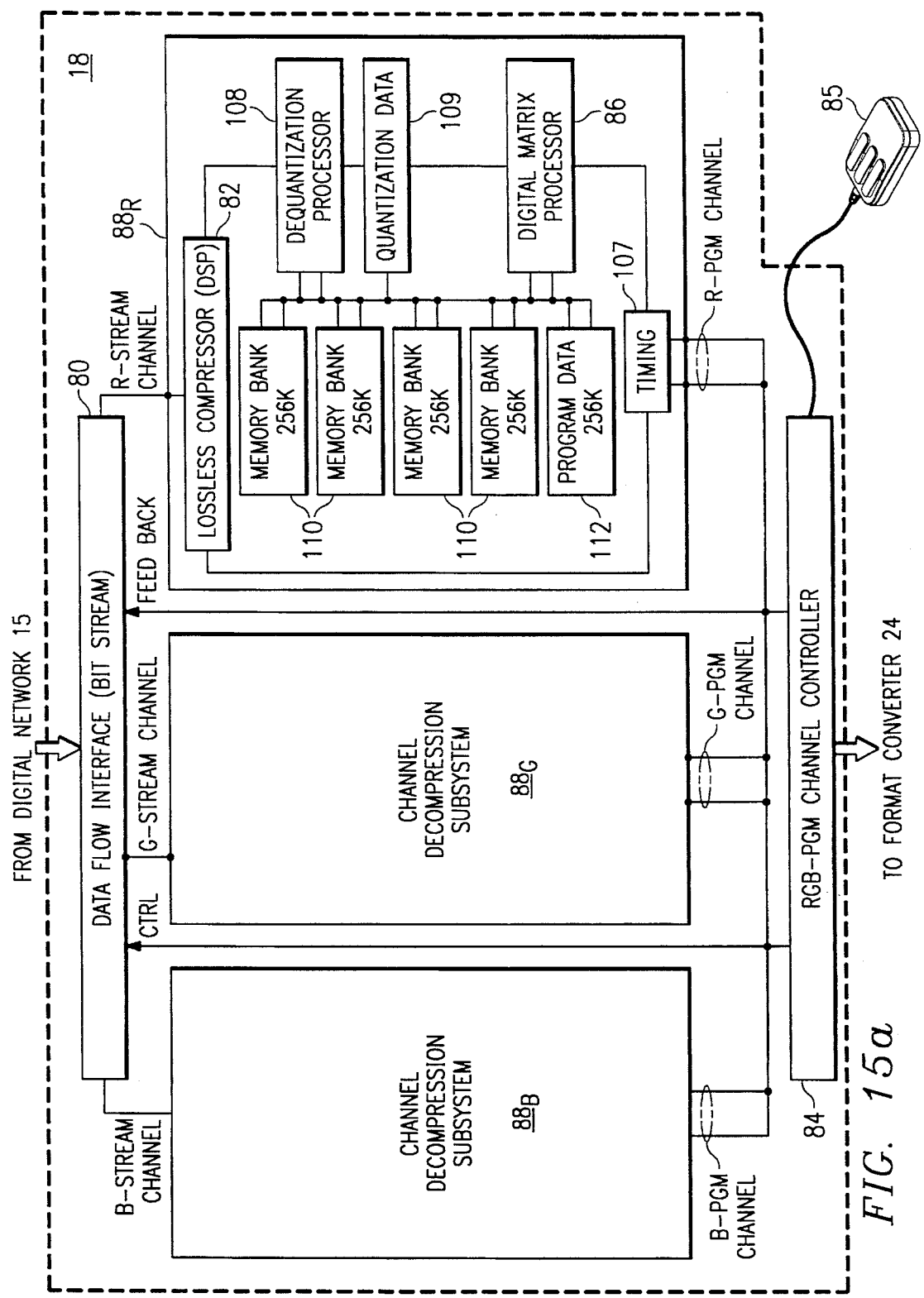
FIG. 15a is an electrical diagram, in block form, of a decompressor according to the preferred embodiment of the invention.

Referring now to FIG. 15a, the construction of decompressor 18 according to the preferred embodiment of the invention will now be described in detail. It is, of course, contemplated that other architectural arrangements of circuitry may be used to decompress video data according to the present invention. Specifically, it is contemplated that a conventional general purpose computer system may be capable of performing the compression of the video image data according to the present invention. However, the example of FIG. 15a incorporates a preferred embodiment of the circuitry for performing the data decompression functions described herein.

In this example, decompressor 18 preferably includes a data flow interface 80 coupled to network 15 to receive the incoming bitstream data of the compressed video image, as described above relative to FIG. 14. Data flow interface 80 provides an interface to network 15, and serves to separate the R, G, and B components of the incoming bitstream into three channels, namely the R-stream, G-stream and B-stream channels. Decompressor 18 also includes main controller 84 and three substantially identical channel decompressor subsystems $88_R$, $88_G$, $88_B$ (collectively or generically referred to as subsystems 88). Main controller 84 preferably controls the operation of the functional circuitry within decompressor 18, and as such is connected by way of the appropriate bidirectional buses and control lines to subsystems 88 and data flow interface 80 to control the timing, feedback and receiving operation of decompressor 18. Main controller 84 is preferably a general purpose programmable microprocessor or other central processing unit (CPU) of sufficient computational power and capacity to process some or all of the image data and to control the performing of the image compression functions to be described hereinbelow. It is contemplated that microprocessors having performance levels similar to or greater than those of the 80486 type (including those available from Intel Corporation or Cyrix Corporation), of the 68040 type (including those available from Motorola), and of the SPARC processor type (available from Texas Instruments Incorporated or Sun Microsystems, Inc.) will be suitable for use as main controller 84 in decompressor 18.

The three channel compressor subsystems $88_R$, $88_G$, $88_B$ each receive a corresponding one of the separated channels presented by data flow interface 80, so that the boundary-spline-wavelet decompression of the three color components is performed in parallel according to this embodiment of the invention. The construction of channel decompressor subsystems 88 is substantially the reverse of that of channel compressor subsystems 29 described hereinabove. Each of subsystems $88_R$, $88_G$, $88_B$ is therefore constructed substantially identical to perform these similar tasks as the others, in parallel; for purposes of clarity, the following description is provided only for channel decompressor subsystem $88_R$, it being understood that the construction and operation of the other subsystems 88 will be similar, if not identical, to subsystem $88_R$ described herein.

Each channel decompressor subsystem 88 according to this embodiment of the invention is specifically designed to perform the functions of lossless decompression, dequantization, and boundary spline wavelet re-composition (or decompression), as used in the decompression operation according to this embodiment of the invention. Channel decompressor subsystem 88 according to this embodiment of the invention includes the circuit functions of digital matrix processor 86, timing circuit 107, dequantization processor 108, lossless decompressor 82, program data memory 112, and multiple memory banks 110 for storage of image data.

The incoming data received by subsystem 88, as shown in FIG. 15a, is received by lossless decompressor 82. Lossless compressor 82 may be implemented by way of a conventional digital signal processor such as the TMSC40, programmed in such a manner as to perform lossless decompression upon the incoming data stream for that channel as presented by data flow interface 80. The lossless decompression performed by lossless decompressor 82 may be according to a conventional technique, such as Huffman encoding, adaptive Huffman encoding, arithmetic encoding, LSQ coding, and the like; specifically, however, lossless decompressor 80 must either recognize (from field 79 of frame 70) or be previously programmed to operate according to the lossless compression technique used in compression of the incoming data. Lossless decompressor 82 stores the decompressed incoming image data in memory banks 110, in preparation for the re-composition of the image data. Alternatively, lossless decompressor 82 may be implemented as a custom logic circuit for providing this function.

The output from lossless decompressor 82 corresponds to the decomposed image data for that channel (R, G, B), in identical form as that presented to lossless compressor 34 in compressor 16, as described hereinabove. Dequantization processor 108 is a logic circuit or programmable device such as a microprocessor, for de-quantize the output from lossless decompressor 82. According to this preferred embodiment of the invention, dequantization processor 108 is controllable to operate according to various quantization or thresholding modes, according to the contents of dequantization code register 109 which receives the contents of field 81 of frame 70. The dequantization value in field 83 is used in the dequantization performed by dequantization processor 108. The results of the dequantization are stored in memory banks 110.

Digital matrix processor 86 performs the boundary-spline-wavelet composition upon the results of the dequantization, using pre-calculated matrices stored in program data 112. The procedure for this composition is described in detail hereinbelow. The results of the operations performed by digital matrix processor 86 are stored in memory banks 110. As in the case of compressor 16, digital matrix processor 86 may be implemented by way of a conventional digital signal processor, such as the i860 microprocessor available from Intel Corporation and the TMSC40 digital signal processor available from Texas Instruments Incorporated, or by way of a general purpose microprocessor such as those of the 80386 and 80486 families available from Intel Corporation, and of the 68030 and 68040 families available from Motorola.

Timing circuit 107 performs the functions of controlling the storage of the channel data from lossless decompressor 82, and the subsequent retrieval thereof for dequantization and decompression processes. Upon completion of the decompression of the channel data for a frame, timing circuit 107 is operable to present the decompressed PGM channel data to main controller 84, for formatting and transmission to format converter 24 for display at display 26.

Main controller 84 receives the decompressed channel data from each of subsystems $88_R$, $88_G$, $88_B$ and sequences the data into the format suitable for receipt by format converter 24. In addition, main controller 84 operates to provide feedback to data flow interface 80, such that upon decompression of a frame of data, data flow interface 80 can be controlled to communicate the next frame of data to subsystems 88 for decompression.

In addition, main controller 84 is coupled to user interface device 85, which may be a mouse, trackball, pen input, keyboard or the like; in addition, user interface device 85 may be implemented as another computer, such as a personal computer workstation, through which a user controls the decompression and display of video data. As noted hereinabove, the construction of frame 70 shown in FIG. 14 facilitates the interactive control of the decompression process, such that the user may control the direction (forward/backward) and rate of decompression and display of the sequence of video image frames, using user interface device 85. Main controller 84 is thus operable to communicate to data flow interface 80 the order and selection of frames for decompression; it is therefore useful to incorporate adequate memory for the storage of multiple frames either within or accessible by data flow interface 80 to allow such interactive decompression and display.

This example of decompressor 18 is intended to support the compression of high definition real-time true color video image data, where "true color" indicates the use of twenty-four bits of color information for each pixel, resulting in 16.7 million possible colors. The decompression rate for decompressor 18 is intended to be on the order of thirty frames per second, so as to support "real-time" video image decompression and display. As noted above, if the color and frame rate requirements are reduced from real-time true color video, it may be possible to implement decompressor 18 as a single channel, i.e. with a single channel compression subsystem 88. In this implementation, color data could be decompressed sequentially for the R, G and B components under the control of main controller 84. In addition, if the frame rate permits, digital matrix processor 86 may be used to perform the lossless decompression, as well.

The construction of decompressor 18 described hereinabove is intended as a "high-end" product utilizing, in a parallel fashion, three processing boards for the three R, G, B channels. This design is preferably used in association with modern high-performance workstations such as the 4D series workstations available from Silicon Graphics, and SPARC workstations available from Sun Microsystems, as these workstations have performance levels adequate for delivering more than thirty frames per second of high resolution (800 pixels by 600 pixels) image data with 24-bit true color capability.

b. Personal-Computer Expansion Card Decompression System

Figure 19:
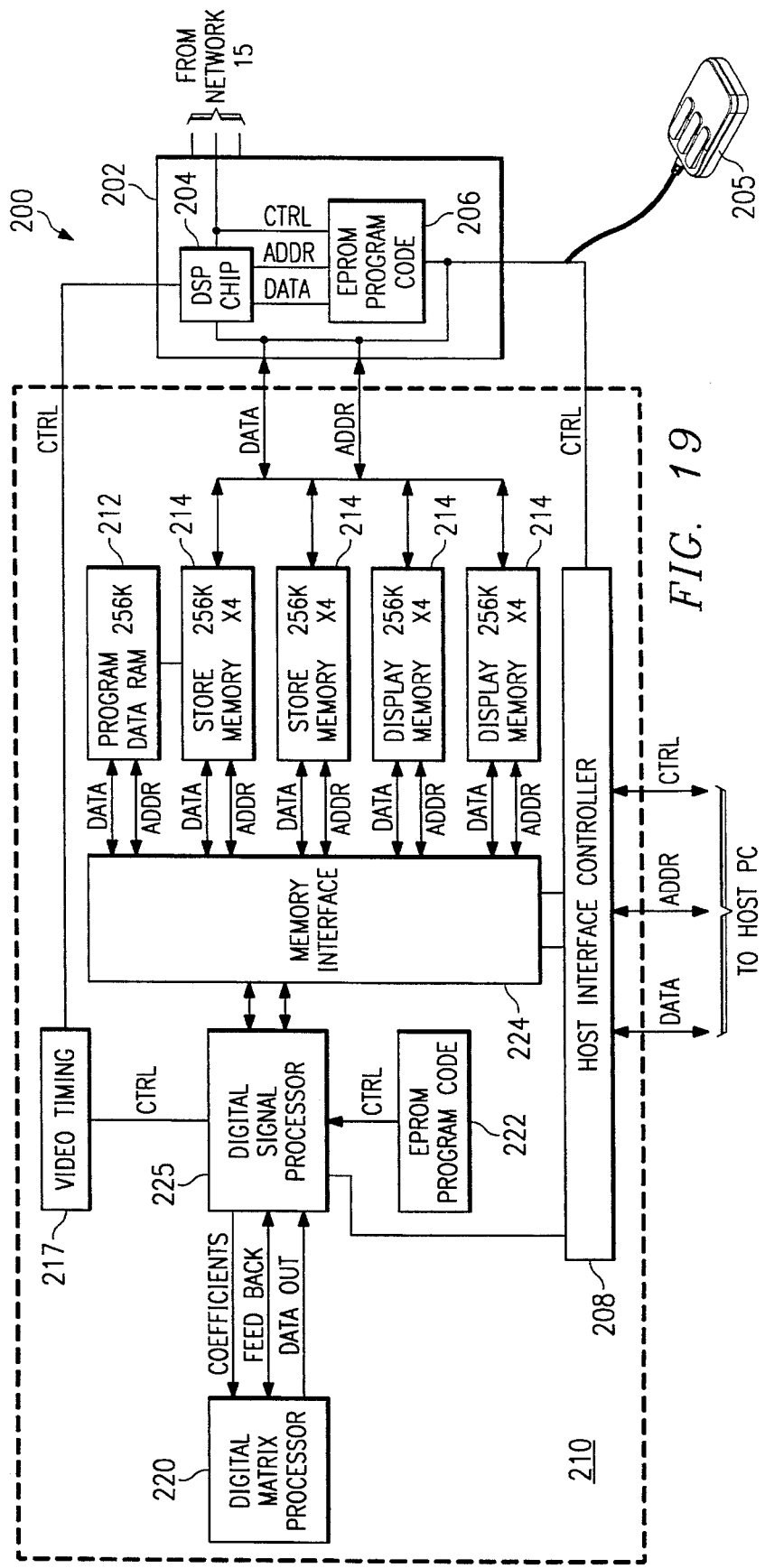
FIG. 19 is an electrical diagram, in block form, of a decompressor system according to an alternative embodiment of the invention.

Referring now to FIG. 19, decompression system 200 according to an alternative embodiment of the invention will now be described in detail. Decompression system 200 is intended for implementation on a conventional PC-based workstation, and is configured as a single 8-bit expansion board; alternatively, system 200 may be configured as a 16-bit ISA or EISA expansion board, or as a MCA (Micro Channel Architecture) board. In each case, it is contemplated that decompression system 200 will be suitable for medium resolution displays.

Decompression system 200 includes lossless decompressor 202, which is implemented as a video processing board. Lossless decompressor 202 has an input port coupled to network 15 (or, of course, to disk storage or another source of video image data compressed according to the method described hereinabove). Lossless decompressor 202 includes digital signal processor (DSP) 204, which is a conventional digital signal processor such as the TMSC25 and TMSC30 types available from Texas Instruments Incorporated, or a general purpose microprocessor such as the 68020 or 68030 type available from Motorola. Program memory 206 is preferably EPROM or other conventional firmware storage, for storing the programs utilized by DSP 204 in performing the lossless decompression upon the received data.

Lossless decompressor 202 receives the compressed RGB-PGM data from network 15 and performs the necessary lossless decompression according to the lossless compression technique used (if any) in compressor 16. It is preferred that lossless decompressor 202 be capable of performing decompression of various types, selectable by way of field 79 in frame 70, described hereinabove relative to FIG. 14. Lossless decompressor 202 is also coupled to user interface device 205, to allow a human user the capability of controlling motion control in the decompression and display of a sequence of video images. Lossless decompressor 202 presents its output to decompression processor 210 for the boundary-spline-wavelet decompression.

Decompression processor 210 according to this embodiment of the invention includes processing capability to perform boundary-spline-wavelet decomposition according to the preferred embodiment of the invention described herein. The main controller of decompression processor 210 is digital signal processor (DSP) 225, which is preferably a high-performance single-chip digital signal processor, such as the TMSC40 available from Texas Instruments Incorporated or the i860 processor available from Intel Corporation, or a high-performance general purpose microprocessor such as the 80486 microprocessor available from Intel Corporation. Decompression processor 210 also includes program data memory 212 for storage of program code and pre-calculated matrices useful in the decompression process, data memory banks 214 for storage of image data, and digital matrix processor 220 for performing matrix operations useful in the decompression routine. Digital matrix processor 220 is preferably a conventional digital signal processor, such as the i860 microprocessor available from Intel Corporation and the TMSC40 digital signal processor available from Texas Instruments Incorporated, or a general purpose microprocessor such as those of the 80386 and 80486 families available from Intel Corporation, and of the 68030 and 68040 families available from Motorola. Host interface controller 208 is also provided within decompression processor 210, for communicating with a host computer (not shown) including the video display associated therewith. Program memory 222 is also provided in decompression processor 210 and contains the program code for boundary spline wavelet reconstruction and format conversion. Video timing control circuit 217 is also contained within decompression processor 210, for controlling the viewing of the decompressed data as well as the timing of the decompression, so that a sequence of video frames may be viewed in real-time as a movie, or under the control of user interface device 205.

In operation, lossless decompressor 202 stores the results of the lossless decompression for a frame in memory banks 214. These data are retrieved by DSP 225 via memory interface 224, according to a sequence stored in program memory 222, and forwarded to digital matrix processor 220 along with precalculated matrices stored in program data 212 along the coefficient bus shown in FIG. 19. Digital matrix processor 220 performs matrix operations upon the image data presented by DSP 225 to perform the boundary-spline-wavelet decomposition and forwards the results to DSP 225 along the data-out bus shown in FIG. 19 for storage in memory banks 214. Digital matrix processor 220 also provides control information to DSP 225 on the feedback bus therebetween.

Upon completion of the boundary-spline-wavelet reconstruction or decompression, the decompressed image data for a frame is stored in memory banks 214. Memory interface 224 enables the interleaved or simultaneous accessing of memory banks 214 for boundary-spline-wavelet decompression and display; host interface controller 208 accesses memory banks 214 for display purposes. Host interface controller 208 may also have sufficient capability to directly display the contents of memory banks 214 containing the decompressed video image data; alternatively, the decompressed image data may be forwarded by host interface controller 208 to memory of the host PC for eventual display, by way of DMA.

It is contemplated, of course, that still further alternatives to the decompression hardware may be utilized according to the present invention.

5. Boundary-Spline-Wavelet Video Image Data Decompression and Display

Figure 16:
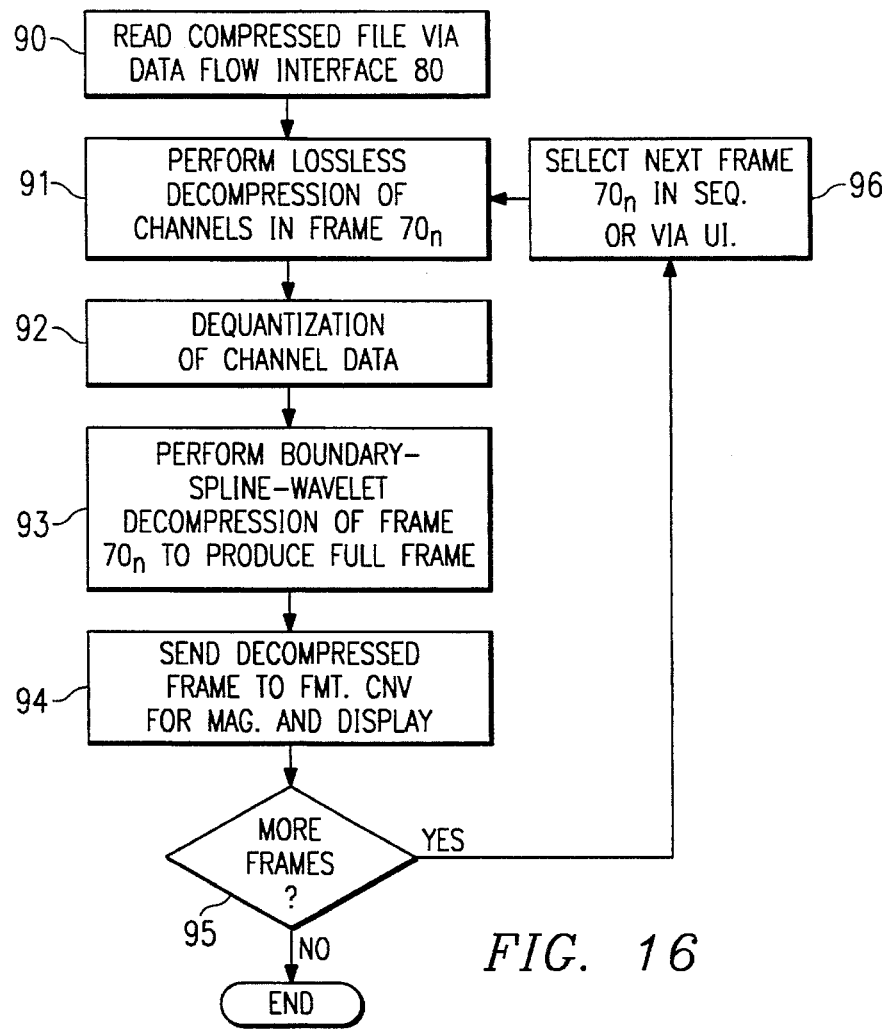
FIG. 16 is a flow chart of a process for decompressing video image data according to the preferred embodiment of the invention.

Referring now to FIG. 16, a method according to the preferred embodiment of the invention, for decompressing video image data that was compressed by way of boundary-spline-wavelet compression as discussed above, will now be described in detail. This decompression will be described relative to the hardware decompression system of FIGS. 4a and 15a, it being understood that analogous operations would be carried out by decompression system 200 illustrated in FIG. 19, for its particular implementation.

The initial step of the decompression method of this example is the reading of the compressed file or sequence of frames 70 by data flow interface 80, indicated in FIG. 16 by process 90. Process 90 may be the result of the receipt of communicated compressed video image data by data flow interface 80 directly from digital network 15. Alternatively, where decompressor 18 is a portion of a stand-alone computer, disk unit 22 or another fixed storage unit may contain the file of compressed video image frames from an earlier transmission, or as archival storage. In either case, the result of process 90 is the receipt of a sequence of compressed video image frames 70 by data flow interface 80, from which the remainder of the process of FIG. 16 can retrieve individual frames 70.

Process 91 is next performed, where each of the channels of a selected frame $70_n$ undergoes lossless decompression by lossless decompressor 82. As noted above relative to FIG. 15a, the channels of data are decompressed in parallel according to the preferred embodiment of the invention, and as such the process flow of FIG. 16 from this point forward will be described for a single channel (R, G, B) of frame $70_n$. The particular frame $70_n$ is selected according to the sequence of frames 70 in the motion picture, or is alternatively selected by the user via user interface device 85. In either case, main controller 84 controls the access of selected frame $70_n$, so that the appropriate frame 70 is presented to channel decompressor subsystems 88, which provide the data for frame $70_n$ to lossless decompressor 82. As noted above, the lossless decompression performed in process 91 by lossless decompressor 82 corresponds to the type of lossless compression performed by lossless compressor 34 in compressor 16. The result of the lossless decompression of process 91 thus provides the final decomposed image blocks 55 of frame $70_n$, quantized as described hereinabove relative to the compression method.

After the lossless decompression of process 91, the image data is dequantized for each channel R, G, B by dequantization processor 108 in its corresponding channel decompression subsystem 88. The type of dequantization performed by dequantization processor 108 is controlled by the contents of dequantization data register 109, which contains a value corresponding to that transmitted as field 81 in frame $70_n$. In the event that the data was quantized, the quantization value transmitted in field 83 of frame $70_n$ is utilized to restore the data to that prior to quantization in compressor 16.

Upon completion of the dequantization of process 92, process 93 is performed for each image block of frame $70_n$ to reconstruct the full video image in PGM format, with each pixel location containing a value corresponding to the intensity at that location. In effect, process 93 reverses the decomposition process described hereinabove relative to FIGS. 6 and 7, according to the boundary-spline-wavelet approach. This reconstruction of process 93 is performed on a block-by-block basis, for each of the image blocks in the selected frame $70_n$. Upon completion of process 93, the selected frame $70_n$ is stored as a PGM format frame in memory banks 110.

Figure 17:
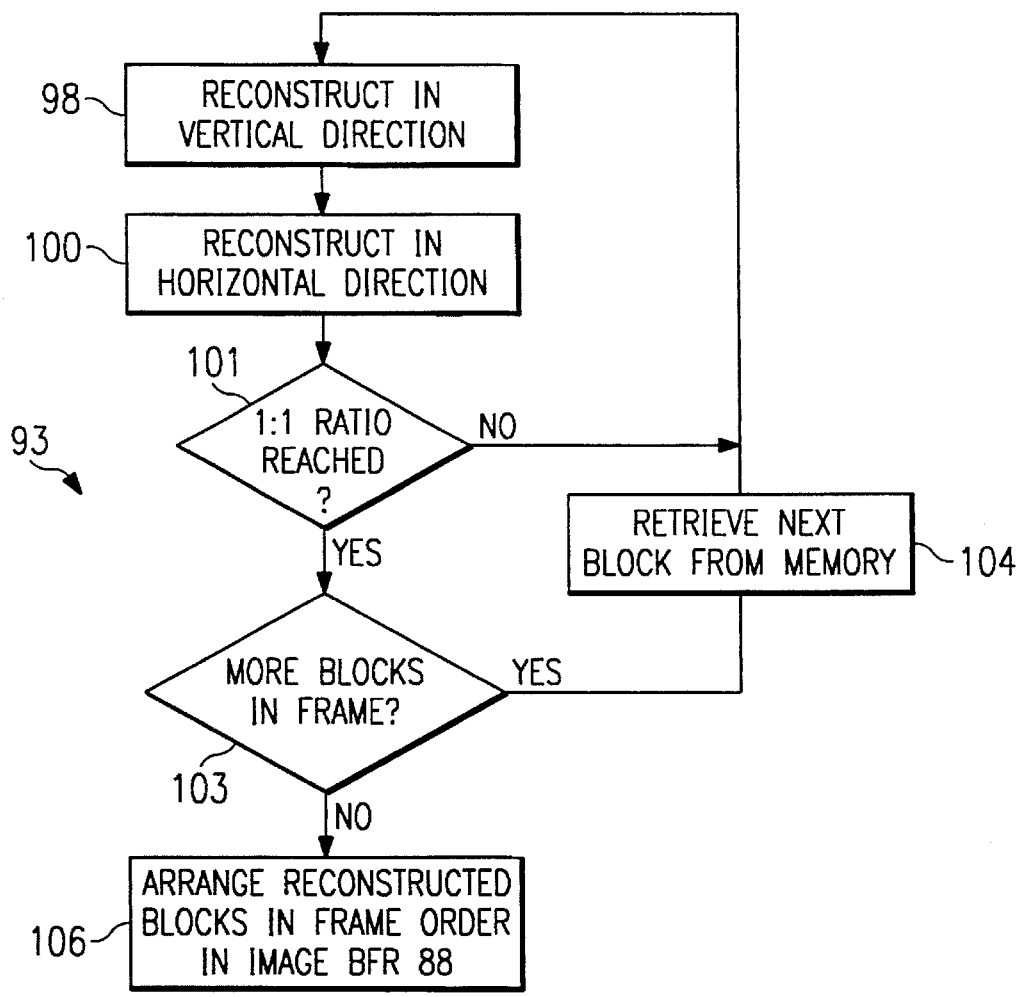
FIG. 17 is a detailed flow chart of a process for reconstructing video image data that were decomposed according to the boundary-spline-wavelet approach of the preferred embodiment of the invention.

Referring now to FIG. 17, a method for reconstructing the selected frame $70_n$ according to the preferred embodiment of the invention will now be described in further detail. Recalling that the decomposition of the video image data performed during compression is performed first in the horizontal direction and then in the vertical direction, the decomposition must be performed in the reverse order. The first step in the reconstruction of the video image data is therefore the reconstruction of each column in the vertical direction, as indicated by process 98.

The reconstruction process 98 is also most efficiently, and thus preferably, performed by digital matrix processor 86 in the corresponding channel decompression subsystem 88 using matrix algebra operations similarly as in the compression process described hereinabove. Accordingly, process 98 begins by considering the image block in columns, each containing a set of coefficients $c^{N-k}$ for the low frequency portion and a set of coefficients $d^{N-k}$ for the high frequency portion, with k being the number of times that boundary-spline-wavelet decomposition was performed during compression to obtain the desired compression ratio. For example, where the compression ratio was 4:1, the value of k would equal 2 (i.e., both a row and a column decomposition was performed once); for a compression ratio of 64:1, k would equal 6.

Figure 18:
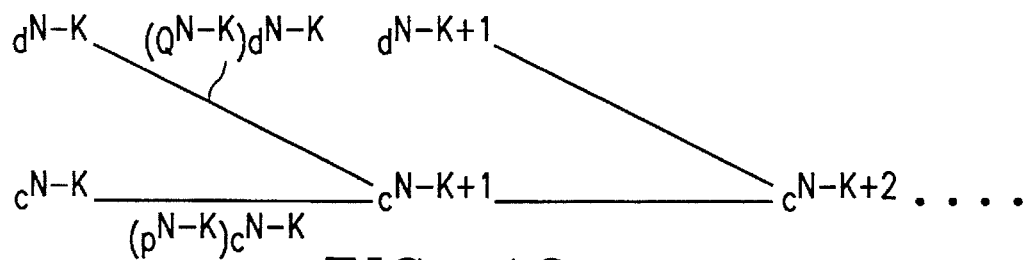
FIG. 18 is a chart illustrating the relationship of the matrices as used in a preferred matrix algebra routine for the reconstruction of FIG. 17.

FIG. 18 illustrates the relationship of the matrices used in the reconstruction of the image block performed in process 98. Each reconstruction operation (process 98) is directed to obtaining the next higher order coefficient values $c_{N-k+1}$. Conversely to the case of compression, the matrix operation is equivalent to:

$$c^{N-k+1}=P^{N-k}c^{N-k}+Q^{N-k}d^{N-k} \qquad [45]$$

where the matrices $P^N$ and $Q^N$ are the spline and wavelet matrices, respectively, for level N, as used in the decomposition and compression process. As noted above, matrices $P^N$ and $Q^N$ can be pre-calculated and stored in the program data memory 112 of channel decompression subsystems 88.

Process 98 thus performs one level of the matrix operations of equation [45] on a column-by-column basis for each column in the image block. Upon completion of process 98, process 100 performs a similar reconstruction as that in process 98, only on a row-by-row basis for each row in the image block. As such, the operation of equation [45] is performed to obtain the coefficients $c^{N-k+2}$.

It will, of course, be noted that the decompression of the video image data according to the preferred embodiment of the invention will not result in an exact duplicate of the input image presented to the compression process, as the effects of the quantization and thresholding process in the compression of the video image data cannot be full recovered (i.e., some data is lost). As such, the boundary-spline-wavelet compression according to the present invention is a lossy compression technique. It is contemplated, however, that the use of the boundary-spline-wavelet approach described hereinabove causes the loss of only that data at high-frequencies, such that the loss of quality of the image is minimized for a given compression ratio.

However, it should especially be noted that the decompression processes 98, 100 can be done quite rapidly, particularly with specialized circuitry such as a digital matrix processor performing the matrix operations noted above. This speed in processing arises from the wavelet forms selected in the compression, which correspond to express mathematical formulae and which are also quite adaptable to matrix operation techniques. As such, it is contemplated that the decompression performed by decompressor 18 can occur quite rapidly and, for many applications, need not require high performance microprocessor circuitry.

Upon the reconstruction in both the column and row directions as performed in processes 98, 100, decision 101 is performed to determine if the image block has been fully reconstructed (i.e., if the image block corresponds to a PGM format image, and does not contain low and high frequency components). If not, the matrix operations of processes 98, 100 are repeated to perform the next levels of reconstruction of the image for that image block.

Upon process 100 completing the reconstruction of the image block, decision 103 tests whether more image blocks remain to be reconstructed in the selected frame $70_n$. If so, the next image block is retrieved from memory 80 (process 104) and is reconstructed by processes 98, 100, 101 as before. Upon completion of the reconstruction of all image blocks in selected frame $70_n$, process 106 is performed so that the reconstructed image blocks in frame $70_n$ are stored in image buffer 88, arranged in the proper order to correspond to a full PGM format image frame, completing process 93 of FIG. 16 for a single frame $70_n$. The decompressed image data for the frame $70_n$, including that for all three channels R, G, B, are the forwarded to main controller 84 for communication to format converter 24. Main controller 84 then indicates completion of a frame to data flow interface and performs decision 95 to determine if additional frames are to be decompressed and display; if so, main controller 84 will select the next frame for decompression in the sequence, or as directed by user interface device 85.

Referring back to FIG. 16, process 94 is then performed by way of which format converter 24 reformats and communicates the frame to display 26, in the desired fashion. It is contemplated that format converter 24 may perform such operations as gathering three successive PGM format frames, corresponding to the red, green, and blue color components of the same image, and presenting the data in RGB-PGM format to display 26; format converter 24 may also convert the RGB-PGM format data into another format, such as PCX, IMG, GIF, TIF, RLE, NTSC and the like, as appropriate for display 26.

Figure 15B:
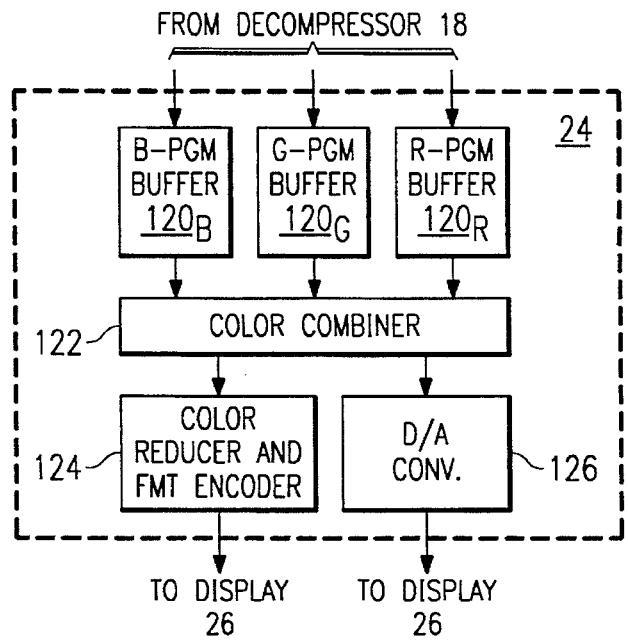

Referring now to FIG. 15b, the construction of format converter 24 according to the preferred embodiment of the invention will now be described in detail. Format converter 24 includes three buffers $120_R$, $120_G$, $120_B$ for receiving from decompressor 18 and storing PGM format data corresponding to the three decompressed R, G, B channels. The outputs of buffers 120 are received by color combiner circuit 122, which is a data processing circuit such as a microprocessor, which combines the decompressed video data for the three R, G, B channels into RGB-PGM format. Color combiner 122 presents the results of this combination to the appropriate formatting circuitry for driving display 26. In the analog case, color combiner 122 presents its output to video digital-to-analog converter (DAC) 126; video DAC 126 is a conventional video DAC suitable for receiving digital video or graphics information and driving analog display 26a. In the digital case, color combiner 122 presents its output to color reducer and format encoder 124. Reducer/ encoder 124 is a conventional circuit for encoding the RGB-PGM format data presented thereto by color combiner 122 into the desired format for digital display 26d, such formats including TIF, IMG, GIF and the like. Of course, if display 26 is capable of directly displaying RGB-PGM video data, reducer/encoder 124 is unnecessary.

In addition, format converter 24 may also include graphics processing capability so as to perform more graphics processing operations, including magnification, zooming and the like. As noted above, the elimination of boundary effects resulting from the boundary-spline-wavelet compression and decompression according to the present invention is especially beneficial when such complex graphics processing features. For example, a portion of the image of frame $70_n$ may be readily magnified according to conventional graphics processing techniques, such as the use of interpolation techniques to fill in pixels between those for which the frame contains actual data, with a high degree of accuracy. In contrast, boundary effects that result from prior compression techniques tend to be exaggerated when the image is magnified, considering not only the magnified display but also the exaggeration resulting from interpolation between "true" image data and the boundary effect artifacts.

Indeed, it is contemplated that the present invention will be especially beneficial for the transmission and storage of compressed video images for display on advanced displays that have higher pixel densities than the density of the image so compressed, due to the elimination of boundary effect artifacts by the present invention. In addition, it is contemplated that such magnification will allow for the display of the images on a plurality of video displays arranged in an array, with each display showing only a portion of the full image.

Referring back to FIG. 16, upon transmission of the selected frame $70_n$ to format converter 24 performed in process 94, decision 95 is then performed to determine if additional frames in the sequence are to be decompressed for display. If so, process 96 selects the next frame 70 for decompression and display. According to the preferred embodiment of the invention, the selection of process 96 may be made in multiple ways. A first approach for selecting the next frame for decompression and display is merely to select the next frame in the sequence, and access the same by way of field 75 (FIG. 14) from the previously decompressed frame $70_n$; this approach will be followed during the decompression and display of a motion picture.

As noted above relative to FIG. 14, field 76 includes data indicating such factors as the compression ratio and the like that indicate the computational complexity required for the decompression and display of its frame. This allows for intelligent selection of the next frame in process 96, where the capability of decompression system 20 is limited relative to the amount of compressed video data in the transmission. For example, if the time that decompressor 18 will require for the decompression and display and display of a frame is longer than the reciprocal of the frequency at which frames are to be displayed (e.g., longer than 1/30 sec. in the case of a conventional motion picture), main controller 84 will skip the next frame or frames, and select a later frame for decompression and display so that the sequence of frames that are displayed will appear in real-time fashion on display 26.

A third approach for the selection of the next frame in process 96 is that which may be directed by the user via user interface device 85. For example, the viewer may wish to display the sequence on a non-real-time basis to allow for intense study of each frame, in either a forward or backward direction, or the viewer may wish to repetitively view a selected portion of the sequence. These commands are conveyed to main controller 84 by user interface device 85, and are used in process 96 according to the present invention to select the next frame.

Upon the decompression and display of all of the frames in the sequence as determined by decision 95, the process of decompression and display ends.

5. Conclusion

The methods and systems for compressing and decompressing video image data described hereinabove relative to the present invention provide important advantages, as noted throughout the foregoing specification. These advantages include the fundamental benefits of wavelet analysis, where time-frequency localization of the input signal is implemented so that the time window narrows with increasing frequency and widens with decreasing frequency, thus providing highly accurate analysis for transient periods of the signal, and avoiding the undersampling problems of conventional Fourier analysis techniques.

In addition, the video image compression and decompression techniques according to the preferred embodiments of the invention utilize boundary-spline-wavelets to eliminate boundary effects in the compressed images, specifically by using different wavelets for samples near the boundaries of an interval from those wavelets used for inner samples. The boundary wavelets do not require support from outside of the interval; when applied to video compression according to the present invention, therefore, boundary effect artifacts are eliminated. This not only provides an extremely accurate representation of the original input image but, when coupled with the computational geometrical superiority of spline functions, also enables the performance of complex processing operations and display such as magnification, dynamic compression on a frame-by-frame basis, interactive display of a motion image, including insertion, editing and repetitive display. In addition, the present invention also enables slow display systems to skip frames so that a motion picture can be displayed on a real-time basis with fewer frames per second.

The elimination of boundary effects also enables the compression routine to be readily applied to subdivided blocks of the input image, without sacrificing image quality upon decompression and display. This allows for parallel processing techniques to be readily applied to the compression and decompression operations. In addition, lower-capacity computing equipment is enabled by the present invention to perform compression and decompression, while still obtaining high compression ratios and excellent picture quality.

In addition, the present invention also enables a relatively higher compression ratio than prior systems, for a given accuracy, due to the improved time-frequency localization provided by the selected wavelets according to the present invention, and also the ability to compress to a desired accuracy limit as described above. The present invention further enables the dynamic compression of a sequence of frames, so that high frequency frames may be compressed to different ratios than low frequency frames.

The present invention may be applied to various applications of video image compression, such as the transmission of motion pictures and other video data between remote locations, such as over digital communication networks or by satellite transmission. The present invention may also be applied advantageously to the archival storage of video image data, both motion picture and still image data, in a compressed form. The archival storage of both motion video and still images is especially facilitated by the present invention due to the lack of boundary effects, as the decompression and display of the compressed information may be performed in much higher density and capability systems than those used in the original compression, without exaggeration of artifacts such as boundary effects.

While the invention has been described herein relative to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

APPENDIX $$(P^N)^T = \frac{1}{32} \begin{pmatrix} 16 & 8 & 0 & \ldots & & & & & & & & \\ 0 & 8 & 12 & 3 & 0 & \ldots & & & & & & \\ 0 & 0 & 4 & 11 & 8 & 2 & 0 & \ldots & & & & \\ 0 & 0 & 0 & 2 & 8 & 12 & 8 & 2 & 0 & \ldots & & \\ 0 & 0 & 0 & 0 & 0 & 2 & 8 & 12 & 2 & 0 & \ldots & \\ 0 & 0 & 0 & 0 & 0 & 0 & 0 & 2 & 8 & 12 & 8 & 2 & 0 & \ldots \\ \vdots & & & & & & & & & & & & \\ 0 & & \ldots & 0 & 2 & 8 & 12 & 8 & 2 & 0 & 0 & 0 \\ 0 & & & \ldots & 0 & 2 & 8 & 11 & 4 & 0 & 0 \\ 0 & & & & \ldots & 0 & 3 & 12 & 8 & 0 \\ 0 & & & & & \ldots & 0 & 8 & 16 \end{pmatrix}$$

$$C^N = \frac{1}{81} \begin{pmatrix} 720 & 441 & 93 & 6 & 0 & \ldots & & & & & & \\ 441 & 1116 & \frac{1575}{2} & 174 & \frac{3}{2} & 0 & \ldots & & & & & \\ 93 & \frac{1575}{2} & 1647 & 1132 & \frac{239}{2} & 1 & 0 & \ldots & & & & \\ 6 & 174 & 1132 & 2416 & 1191 & 120 & 1 & 0 & \ldots & & & \\ 0 & \frac{3}{2} & \frac{239}{2} & 1191 & 2416 & 1191 & 120 & 1 & 0 & \ldots & & \\ 0 & 0 & 1 & 120 & 1191 & 2416 & 1191 & 120 & 1 & 0 & \ldots & \\ 0 & 0 & 0 & \ddots & \ddots & \ddots & \ddots & \ddots & \ddots & \ddots & \ddots & \\ & & \ldots & 0 & 1 & 120 & 1191 & 2416 & 1191 & 120 & 1 & 0 & 0 \\ & & \ldots & 0 & 1 & 120 & 1191 & 2416 & 1191 & \frac{239}{2} & \frac{3}{2} & 0 \\ & & & \ldots & 0 & 1 & 120 & 1191 & 2416 & 1132 & \frac{239}{2} & 174 & 6 \\ & & & \ldots & 0 & 1 & \frac{239}{2} & 1132 & 1647 & \frac{1575}{2} & 93 \\ & & & & \ldots & 0 & \frac{3}{2} & 174 & \frac{1575}{2} & 116 & 441 \\ & & & & \ldots & 0 & 6 & 93 & 441 & 720 \end{pmatrix}$$

| | $q_{3,1}$ | $q_{2,1}$ | $q_{1,1}$ | $q_{0,1}$ |
|---|---|---|---|---|
| −3 | $\frac{-1136914560}{27877}$ | $\frac{2387315060}{195139}$ | $\frac{-123066720}{1365937}$ | 0 |
| −2 | $\frac{1655323200}{27877}$ | $\frac{-2141121840}{195139}$ | $\frac{2226000}{1365937}$ | 0 |
| −1 | $\frac{-1321223960}{27877}$ | $\frac{-878161880}{195139}$ | $\frac{-188417600}{1365937}$ | 0 |
| 0 | $\frac{633094403}{27877}$ | $\frac{498772701}{27877}$ | $\frac{2293862247}{1365937}$ | 1 |
| 1 | $\frac{-229000092}{27877}$ | $\frac{-4726413628}{195139}$ | $\frac{-10796596516}{1365937}$ | −124 |
| 2 | $\frac{46819570}{27877}$ | $\frac{3606490941}{195139}$ | $\frac{25245248833}{1365937}$ | 167 |
| 3 | −124 | −7904 | −2464 | −7904 |
| 4 | 1 | 1677 | 18482 | 18482 |

APPENDIX-continued

| | | | | |
|---|---|---|---|---|
| 5 | 0 | −124 | −7904 | −2426 |
| 6 | 0 | 1 | 1677 | 18482 |
| 7 | 0 | 0 | −124 | −790 |
| 8 | 0 | 0 | 1 | 1677 |
| 9 | 0 | 0 | 0 | −124 |
| 10 | 0 | 0 | 0 | 1 |

We claim:

1. A method of compressing digital data representative of a video image for communication thereof, comprising the steps of:

formatting the digital data corresponding to a frame of the video image into an array of locations in rows and columns, with each array location having a display intensity value;

compressing the digital data by performing the steps of:

decomposing said array, in a first direction, into a low-frequency portion by applying a first finite matrix filter derived from a boundary-spline-wavelet scaling function, and into a high-frequency portion by applying a second finite matrix filter derived from a boundary-spline-wavelet wavelet function corresponding to the boundary-spline-wavelet scaling function, wherein each of said first and second finite matrix filters have an interior portion and have a boundary portion with different coefficient entries than its corresponding interior portion, and wherein the boundary portion of the second finite matrix filter is larger than the boundary portion of the first finite matrix filter;

arranging results of the decomposing into the array as corresponding vectors in the first direction; and then decomposing the arranged results of the first decomposing step in a second direction, by applying the first and second finite matrix filters to said results; and communicating the results of the compressing step to a receiving unit.

2. The method of claim 1, wherein said communicating step comprises:

storing the results of the compressing step in a fixed memory.

3. The method of claim 1, wherein said communicating step comprises:

transmitting the results of the compressing step to a decompression system for display.

4. The method of claim 3, wherein the transmitted results of the compressing step corresponds to a compressed video frame; and further comprising:

receiving the compressed video frame;

decompressing the compressed video frame by performing the steps of:

reconstructing the compressed video frame in the second direction, by applying the first and second finite matrix filters to the compressed video frame;

then reconstructing results of the first reconstructing step in the first direction, by applying the first and second finite matrix filters to said results; and displaying the results of the decompressing step on a video display.

5. The method of claim 1, wherein the results of the second decomposing step comprise:

an LL component, corresponding to the low-frequency component, taken in the second direction, of the low-frequency decomposition in the first direction of the first decomposing step;

an LH component, corresponding to the high-frequency component, taken in the second direction, of the low-frequency decomposition in the first direction of the first decomposing step;

an HL component, corresponding to the low-frequency component, taken in the second direction, of the high-frequency decomposition in the first direction of the first decomposing step; and an HH component, corresponding to the high-frequency component, taken in the second direction, of the high-frequency decomposition in the first direction of the first decomposing step;

and further comprising:

quantizing the LH, HL, and HH components prior to said communicating step.

6. The method of claim 5, further comprising:

after said quantizing step and prior to said communicating step, performing lossless compression on the LL, LH, HL, and HH components.

7. The method of claim 5, further comprising:

repeating said decomposing steps.

8. The method of claim 5, further comprising:

transmitting the LL component and the quantized LH, HL, HH components over a communications network;

receiving the transmitted components from the communications network;

reconstructing a low-frequency component front the LL and quantized LH components by applying the first and second finite matrix filters to said LL and LH components in the second direction, and reconstructing a high-frequency component from the quantized HL and HH components by applying the first and second finite matrix filters to said HL and HH components in the second direction;

then reconstructing a video image from said low-frequency component and said high-frequency component by applying the first and second finite matrix filters to said low-frequency and high-frequency components in the first direction; and displaying the results of the reconstructing steps on a video display.

9. The method of claim 8, further comprising:

after said quantizing step and prior to said communicating step, performing lossless compression on the LL, LH, HL, and HH components; and after said receiving step, performing lossless decompression on the communicated LL, LH, HL and HH components.

10. The method of claim 8, further comprising:

repeating said decomposing steps a selected number of times prior to said communicating step; and repeating said reconstructing steps the selected number of times prior to said displaying step.

11. The method of claim 5, further comprising:

prior to said decomposing steps, dividing each frame into a plurality of image blocks;

wherein said decomposing steps are performed for each image block of each frame, so that each of said image blocks comprises a LL component and quantized LH, HL, and HH components.

12. The method of claim 11, further comprising:

transmitting the LL component and rite quantized LH, HL, HH components for each of said image blocks of each frame over a communications network;

receiving the transmitted components from the communications network;

for each of said image blocks, reconstructing a low-frequency component from the LL and quantized LH components by applying the first and second finite matrix filters to said LL and LH components in the second direction, and reconstructing a high-frequency component from the quantized HL and HH components by applying the first and second finite matrix filters to said HL and HH components in rite second direction;

then, for each of said image blocks, reconstructing a video image from said low-frequency component and said high-frequency component by applying the first and second finite matrix filters to said low-frequency and high-frequency components in the first direction;

arranging the reconstructed video image for each of said image blocks into a video frame; and displaying the video frame on a video display.

13. A method of displaying compressed video image data, comprising:

receiving compressed video image data corresponding to a compressed frame and storing the compressed frame in memory, said compressed video image data arranged as first, second, third and fourth frequency domain components in an array;

in a first image direction of the array, applying a first finite matrix filter derived from a boundary-spline-wavelet scaling function to the first and third frequency domain components, and applying a second finite matrix filter derived from a boundary-spline-wavelet wavelet function corresponding to the boundary-spline-wavelet scaling function to the second and fourth frequency domain components, wherein each of the first and second finite matrix filters have an interior portion and have a boundary portion with different coefficients than its corresponding interior portion, and wherein the boundary portion of the second finite matrix filter is larger than the boundary portion of the first finite matrix filter, to reconstruct a low-frequency component from the first and second frequency domain components, and to reconstruct a high-frequency component from the third and fourth frequency domain components;

in a second image direction of the array, applying the first and second finite matrix filters to the low-frequency component and high-frequency components, respectively, to reconstruct the video image frame; and displaying a reconstructed video image frame on a video display.

14. The method of claim 13, further comprising:

repeating said steps of applying the first and second finite matrix filters in the first and second image directions a selected number of times.

15. The method of claim 13, wherein said steps of applying the first and second finite matrix filters are performed, for each frame, for a plurality of image blocks of said frame.

16. The method of claim 13, further comprising:

performing lossless decompression on the compressed video image data, prior to said applying steps.

17. The method of claim 13, further comprising:

after said applying steps, storing the reconstructed video image frame in an image buffer.

18. The method of claim 17, further comprising:

after said storing step, magnifying the image of said reconstructed video image frame prior to said displaying step.

19. A system for communicating video image information, comprising:

an input source for providing digital video image information arranged as frames; and compressor circuitry having an input coupled to said input source, for decomposing each frame of digital video image information in a first image direction, into a first low-frequency component by applying a first finite matrix filter derived from a boundary-spline-wavelet scaling function, and into a first high-frequency component by applying a second finite matrix filter derived from a boundary-spline-wavelet wavelet function corresponding to the boundary-spline-wavelet scaling function, wherein each of the first and second finite matrix filters have an interior portion and have a boundary portion with different coefficient entries than its corresponding interior portion, and wherein the boundary portion of the second finite matrix filter is larger than the boundary, portion of the first finite matrix filter, and for then further decomposing each of said first low-frequency and first high-frequency components of each frame of digital video image information in a second image direction into first and second pairs of low-frequency and high-frequency components by applying the first and second finite matrix filters, said first pair corresponding to a decomposed representation of said first low-frequency component and said second pair corresponding to a decomposed representation of said first high-frequency component, said compressor circuitry also having an output for presenting the first and second pairs of low-frequency and high-frequency components.

20. The system of claim 19, further comprising:

a format converter circuit coupled between said input video source and said compressor, for converting the digital input video information into a portable gray-level format.

21. The system of claim 20, wherein said input source provides color video information;

and wherein said format converter circuit is for converting the color video information into a plurality of portable gray-level format representations, each representation corresponding to a color component.

22. The system of claim 19, wherein said compressor circuitry comprises:

decomposing circuitry for performing the decomposing of each frame of digital video image information into the first and second pairs of low-frequency and high-frequency components;

quantization circuitry for quantizing the high-frequency component of said first pair, and for quantizing the both the low-frequency and the high-frequency component of the second pair; and lossless compression circuitry, having an input coupled to said quantization circuitry, for performing lossless compression of the first and second low-frequency and high-frequency pairs, prior to presenting the decomposed frames of digital video image information at the output of the compressor circuitry.

23. The system of claim 22, further comprising:
main controller circuitry, for controlling the decomposing circuitry, so that the low-frequency component of said first pair may be repetitively provided to the decomposing circuitry for further decomposing.

24. The system of claim 19, wherein said compressor circuitry comprises:
an image buffer coupled to the input of the compressor circuitry for storing a frame of digital video image information; and
a digital matrix processor for performing the decomposing of each frame of digital video image information into the first and second pairs of low-frequency and high-frequency components by applying the first and second finite matrix filters.

25. The system of claim 24, wherein said digital matrix processor operates according to matrix operations using precalculated matrices corresponding to spline and wavelet components and stored in said compressor circuitry.

26. The system of claim 19, further comprising:
a storage unit, coupled to the output of said compressor circuitry, for storing the decomposed frames of digital video image information.

27. The system of claim 19, wherein the output of said compressor circuitry is coupled to a digital network for communication of said decomposed frames of digital video image information.

28. The system of claim 27, wherein said compressor circuitry comprises:
decomposing circuitry for performing the decomposing of each frame of digital video image information into the first and second pairs of low-frequency and high-frequency components;
quantization circuitry for quantizing the high-frequency component of said first pair, and for quantizing the both the low-frequency and the high-frequency component of the second pair; and
lossless compression circuitry, having an input coupled to said quantization circuitry, for performing lossless compression of the first and second low-frequency and high-frequency pairs, prior to presenting the decomposed frames of digital video image information at the output of the compressor circuitry;
and wherein the output of the lossless compression circuitry is coupled to the digital network so that the decomposed frames of digital video image information are communicated after the lossless compression.

29. The system of claim 19, further comprising:
a communications network coupled to the output of the compressor circuitry;
decompressor circuitry, having an input coupled to said communications network, for reconstructing each decomposed frame of digital video image information in the second image direction by applying the first and second finite matrix filters, and for then further reconstructing each frame of decomposed digital video image information in the first image direction by applying the first and second finite matrix filters; and
a video display, for displaying reconstructed frames of digital video image information.

30. The system of claim 29, wherein said compressor circuitry comprises:
decomposing circuitry for performing the decomposing of each frame of digital video image information into the first and second pairs of low-frequency and high-frequency components;
quantization circuitry for quantizing the high-frequency component of said first pair, and for quantizing the both the low-frequency and the high-frequency component of the second pair; and
and wherein said decompressor circuitry comprises:
reconstructing circuitry, for reconstructing a digital output video frame from the decomposed frames of digital video image information, by reconstructing an approximation of the first low-frequency component from the first low-frequency and high-frequency pair in the second image direction, and an approximation of the first high-frequency component from the second low-frequency and high-frequency pair in the second image direction, and by then reconstructing the digital output video frame from the approximations of the first low-frequency component and the first high-frequency component in the first image direction.

31. The system of claim 30, wherein the compressor circuitry further comprises:
main controller circuitry for controlling the operation of the decomposing circuitry, so that the low-frequency component of said first pair may be repetitively provided to the decomposing circuitry for further decomposing
and wherein the decompressor circuitry further comprises:
main controller circuitry, for controlling the operation of the reconstructing circuitry so that results of the reconstructing may be repetitively operated upon by the reconstructing circuitry, depending upon a number of times the decomposing circuitry repetitively decomposed the digital input video frame.

32. The system of claim 30, wherein said compressor circuitry further comprises:
lossless compression circuitry, having an input coupled to said quantization circuitry, for performing lossless compression of the first and second low-frequency and high-frequency pairs, prior to presenting the decomposed frames of digital video image information to the communications network;
and wherein said decompressor circuitry further comprises:
lossless decompression circuitry, having an input coupled to the communications network for performing lossless decompression of the digital video image information received therefrom.

33. A system for displaying compressed video image data, comprising:
a memory for storing a plurality of compressed video frames;
decompressor circuitry for reconstructing each of said plurality of compressed frames in a first image direction by applying a first finite matrix filter derived from a boundary-spline-wavelet scaling function to a low-frequency component, and by applying a second finite matrix filter derived from a boundary-spline-wavelet wavelet function corresponding to the boundary-spline-wavelet scaling function to a high-frequency component, wherein each of the first and second finite matrix filters have an interior portion and have a boundary portion with different coefficient entries than its corresponding interior portion, and wherein the boundary portion of the second finite matrix filter is larger than the boundary portion of the first finite matrix filter, and for then further reconstructing each of said plurality of compressed frames in a second image direction by again applying the first and second finite matrix filters; and a video display, coupled to said decompressor circuitry, for displaying each of said plurality of reconstructed frames.

34. The system of claim 33, wherein said memory is coupled to a communications network.

35. The system of claim 33, wherein said decompressor circuitry comprises:

a digital matrix processor coupled to said memory, for reconstructing each of said plurality of frames using precalculated matrices.

36. The system of claim 33, wherein each of said plurality of frames are stored in said memory in a form of the type comprising quantized first and second pairs of low-frequency and high-frequency components, said first pair of low-frequency and high-frequency components corresponding to a decomposition, in the first direction, of a low-frequency decomposition in the second direction of a video image frame, and said second pair of low-frequency and high-frequency components corresponding to a decomposition, in the first direction, of a high-frequency decomposition in the second direction of the video image frame.

37. The system of claim 36, wherein each of said plurality of frames are stored in said memory in a form including a lossless compression of said quantized first and second pairs of low-frequency and high-frequency components; and further comprising:

lossless decompression circuitry, coupled between said memory and said decompressor circuitry, for performing lossless decompression of each of said plurality of frames prior to the reconstruction thereof by said decompressor circuitry.

38. The system of claim 36, wherein said first and second pairs of low-frequency and high-frequency components correspond to repetitively decomposed components of a video image; and further comprising:

main controller circuitry, for controlling the decompressing circuitry so that the result of the reconstructing may be repetitively operated upon by the decompressing circuitry according to a number of times that the stored frames were repetitively decomposed.

39. The system of claim 33, wherein each of said plurality of frames stored in said memory correspond to a plurality of compressed image blocks;

and wherein said decompressor circuitry reconstructs each of the compressed image blocks for each of said plurality of compressed frames in the first image direction using the first and second finite matrix filters, and for then further reconstructing each of the compressed image blocks for said plurality of compressed frames in the second image direction using the first and second finite matrix filters.

* * * * *